US010554831B2

United States Patent
Fukasawa

(10) Patent No.: US 10,554,831 B2
(45) Date of Patent: Feb. 4, 2020

(54) REMOTE MAINTENANCE SYSTEM FOR IMAGE PROCESSING APPARATUS, CAPABLE OF REDUCING USER'S TIME AND EFFORT, COMMUNICATION ESTABLISHMENT METHOD, AND STORAGE MEDIUM

(71) Applicant: CANON KABUSHIKI KAISHA, Tokyo (JP)

(72) Inventor: Nobuaki Fukasawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/969,145

(22) Filed: May 2, 2018

(65) Prior Publication Data
US 2018/0332182 A1 Nov. 15, 2018

(30) Foreign Application Priority Data

May 10, 2017 (JP) .................................. 2017-093987

(51) Int. Cl.
*H04W 76/00* (2018.01)
*H04W 76/19* (2018.01)
(Continued)

(52) U.S. Cl.
CPC ..... *H04N 1/00344* (2013.01); *H04N 1/00244* (2013.01); *H04N 1/32358* (2013.01);
(Continued)

(58) Field of Classification Search
USPC .............. 358/1.1–3.29, 1.11–1.18, 504, 406; 399/8–126
See application file for complete search history.

(56) References Cited

U.S. PATENT DOCUMENTS 6,973,482 B2* 12/2005 Mohammed ............ G06F 21/33
709/202
9,313,345 B2* 4/2016 Fukushima ........ H04N 1/00344
(Continued)

FOREIGN PATENT DOCUMENTS

JP 2015037259 A 2/2015

*Primary Examiner* — Marcellus J Augustin
(74) *Attorney, Agent, or Firm* — Rossi, Kimms & McDowell LLP

(57) ABSTRACT

A remote maintenance system capable of reducing user's time and effort required to establish communication between an image processing apparatus and an operator terminal. An operator terminal performs remote maintenance communication with an image processing apparatus via a relay server, for performing a maintenance operation of the image processing apparatus. A connection request for connecting to an operator terminal is received from an image processing apparatus, and the remote maintenance communication between the image processing apparatus and the operator terminal is established based on the connection request. When the connection request is received, an operator terminal that has not established the remote maintenance communication is assigned to an image processing apparatus that has sent the connection request, and the remote maintenance communication between the image processing apparatus having sent the connection request and the assigned operator terminal is established.

5 Claims, 23 Drawing Sheets

(51) Int. Cl.
*G21B 1/25* (2006.01)
*H04N 1/00* (2006.01)
*H04N 1/327* (2006.01)
*H04N 1/32* (2006.01)

(52) U.S. Cl.
CPC . *H04N 1/32771* (2013.01); *H04N 2201/0041* (2013.01); *H04N 2201/0094* (2013.01)

(56) References Cited

U.S. PATENT DOCUMENTS

| | | | |
|---|---|---|---|
| 9,389,816 B2 | 7/2016 | Nishiyama | |
| 10,148,852 B2 * | 12/2018 | Ooba | H04N 1/32747 |
| 2017/0188399 A1 * | 6/2017 | Nagano | G06F 11/30 |
| 2017/0214824 A1 * | 7/2017 | Ooba | H04L 41/085 |

* cited by examiner

REMOTE MAINTENANCE SYSTEM FOR IMAGE PROCESSING APPARATUS, CAPABLE OF REDUCING USER'S TIME AND EFFORT, COMMUNICATION ESTABLISHMENT METHOD, AND STORAGE MEDIUM

BACKGROUND OF THE INVENTION

Field of the Invention

The present invention relates to a remote maintenance system for an image processing apparatus, which is capable of reducing user's time and effort, a communication establishment method, and a storage medium.

Description of the Related Art

There is a case where when a system error occurs in an image processing apparatus, a user makes an inquiry to a call center, and an operator of the call center copes with the error by operating the image processing apparatus by remote control from an operator terminal according to the details of the error. In this case, the user inputs a terminal ID notified from the call center to an operating section of the image processing apparatus, and causes communication to be established between the image processing apparatus and the operator terminal indicated by the notified terminal ID (see e.g. Japanese Laid-Open Patent Publication (Kokai) No. 2015-037259). This enables the operator of the call center to operate the image processing apparatus by remote control from the operator terminal.

However, in the above-described technique disclosed in Japanese Laid-Open Patent Publication (Kokai) No. 2015-037259, the user is required to input the terminal ID to the operating section of the image processing apparatus to cause communication to be established between the image processing apparatus and the operator terminal, which requires user's time and effort.

SUMMARY OF THE INVENTION

The present invention provides a remote maintenance system for an image processing apparatus, which is capable of reducing user's time and effort required to cause communication to be established between the image processing apparatus and an operator terminal, a communication establishment method, and a storage medium.

In a first aspect of the present invention, there is provided a remote maintenance system for an image processing apparatus, in which an operator terminal performs remote maintenance communication with an image processing apparatus via a relay server, for performing a maintenance operation of the image processing apparatus, comprising at least one memory device that stores a set of instructions, and at least one processor that executes the set of instructions to receive a connection request from the image processing apparatus, for connecting to the operator terminal, establish the remote maintenance communication between the image processing apparatus and the operator terminal based on the connection request, assign, in a case where the connection request is received, an operator terminal that has not established the remote maintenance communication to an image processing apparatus that has sent the connection request, and establish the remote maintenance communication between the image processing apparatus having sent the connection request and the assigned operator terminal.

In a second aspect of the present invention, there is provided a communication establishment method of establishing remote maintenance communication for an operator terminal to perform a maintenance operation of an image processing apparatus via a relay server, comprising receiving a connection request from the image processing apparatus, for connecting to the operator terminal, and establishing the remote maintenance communication between the image processing apparatus and the operator terminal based on the connection request, wherein said establishing the remote maintenance communication includes assigning, in a case where the connection request is received, an operator terminal that has not established the remote maintenance communication to an image processing apparatus that has sent the connection request, and establishing the remote maintenance communication between the image processing apparatus having sent the connection request and the assigned operator terminal.

In a third aspect of the present invention, there is provided a non-transitory computer-readable storage medium storing a computer-executable program for executing a communication establishment method of establishing remote maintenance communication for an operator terminal to perform a maintenance operation of an image processing apparatus via a relay server, wherein the method comprises receiving a connection request from the image processing apparatus, for connecting to the operator terminal, and establishing the remote maintenance communication between the image processing apparatus and the operator terminal based on the connection request, wherein said establishing the remote maintenance communication includes assigning, in a case where the connection request is received, an operator terminal that has not established the remote maintenance communication to an image processing apparatus that has sent the connection request, and establishing the remote maintenance communication between the image processing apparatus having sent the connection request and the assigned operator terminal.

According to the present invention, it is possible to reduce user's time and effort required to cause communication to be established between the image processing apparatus and the operator terminal.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
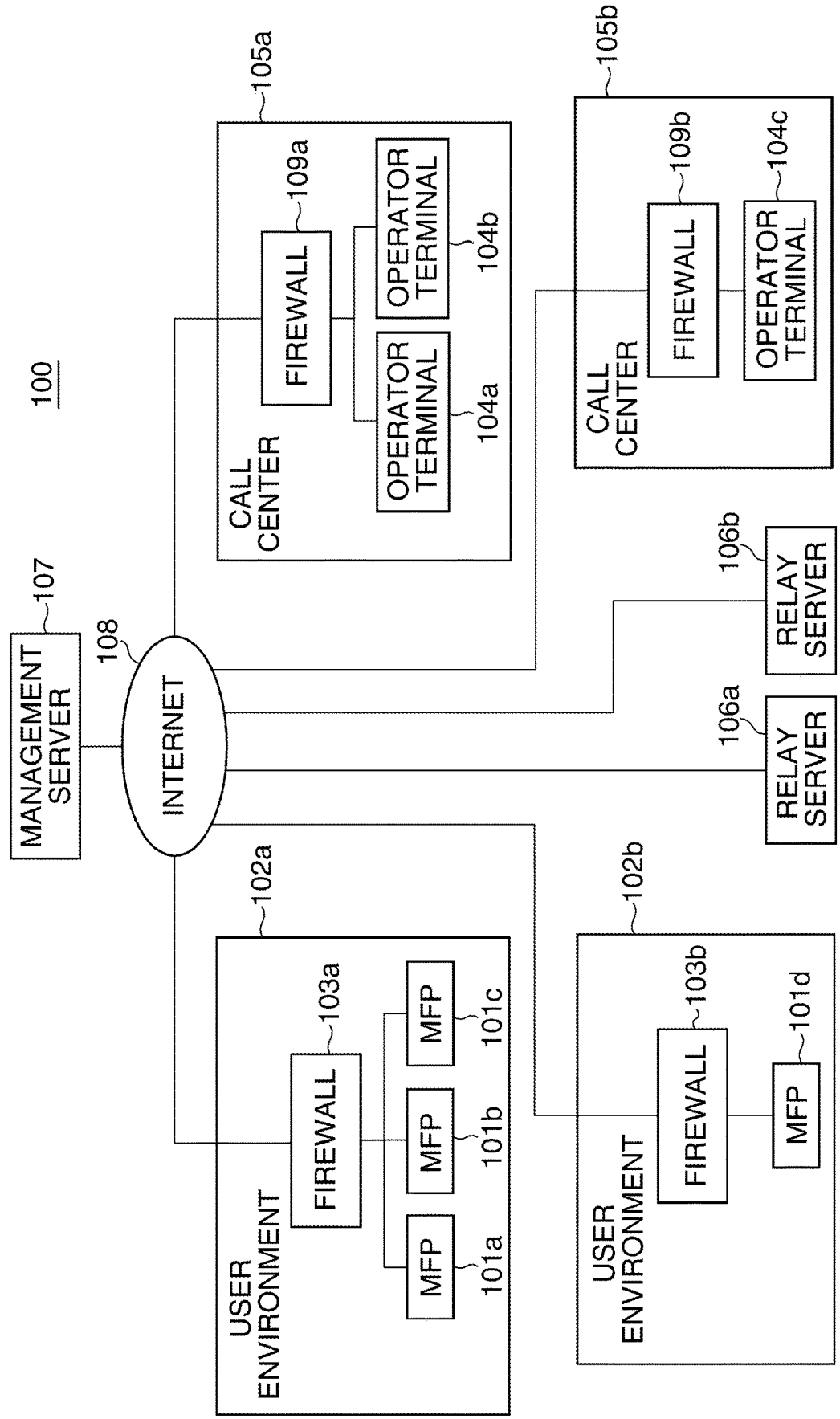
FIG. 1 is a schematic block diagram of a remote maintenance system according to an embodiment of the present invention.

FIG. 1 is a schematic block diagram of a remote maintenance system 100 according to an embodiment of the present invention.

Referring to FIG. 1, the remote maintenance system 100 is comprised of MFPs (image processing apparatuses) 101a to 101d, operator terminals 104a to 104c, relay servers 106a and 106b, and a management server 107.

The MFPs 101a to 101c are arranged in a user environment 102a, and the user environment 102a has a firewall 103a installed therein for restricting accesses from external apparatuses via the Internet 108. The MFP 101d is arranged in a user environment 102b which is different from the user environment where the MFPs 101a to 101c are arranged, and the user environment 102b has a firewall 103b installed therein for restricting accesses from external apparatuses via the Internet 108.

The operator terminals 104a and 104b are arranged in a call center 105a which provides maintenance service for the MFPs 101a to 101c. The call center 105a has a firewall 109a installed therein for restricting accesses from external apparatuses via the Internet 108. The operator terminal 104c is arranged in a call center 105b which provides maintenance service for the MFP 101d, and the call center 105b has a firewall 109b installed therein for restricting accesses from external apparatuses via the Internet 108. In the present embodiment, the call center for providing maintenance service is different for each user environment or sales organization of the MFP. For this reason, when any of the MFPs 101a to 101c sends a maintenance service request, the MFP having sent the request is connected to one of the operator terminals 104a and 104b, and when the MFP 101d sends a maintenance service request, the MFP 101d is connected to the operator terminal 104c.

The relay servers 106a and 106b each relay transmission and reception of data concerning maintenance service (hereinafter referred to as the "maintenance service data"). The maintenance service data includes a moving image, voice data, and information necessary for performing operation by remote control. In the present embodiment, at least one relay server 106a relays communication between the user environment 102a and the call center 105a, and at least one relay server 106b relays communication between the user environment 102b and the call center 105b. In the remote maintenance system 100, data communication between the user environment 102a and the call center 105a is restricted by the firewalls 103a and 109a. Further, data communication between the user environment 102b and the call center 105b is restricted by the firewalls 103b and 109b. On the other hand, in the present embodiment, data communication by HTTP (Hyper Text Transfer Protocol) (hereinafter referred to as the "HTTP communication") is performed between an MFP and an operator terminal. HTTP is a client/server-type protocol defined by RFC (Request For Comment) 2616, and has a plurality of methods. In the HTTP communication, in general, a GET method is used when a client acquires information from a server, and a POST method is used when the client transmits information to the server.

For example, in a case where the operator terminal 104a transmits one data item to the MFP 101a, the operator terminal 104a sends a POST request to the relay server 106a, and further transmits the one data item to the relay server 106a. With this, the one data item is stored in the relay server 106a. After that, the MFP 101a sends a GET request to the relay server 106a, and acquires the one data item from the relay server 106a. On the other hand, in a case where the MFP 101a transmits another data item to the operator terminal 104a, the MFP 101a sends a POST request to the relay server 106a, and further transmits the other data item to the relay server 106a. With this, the other data item is stored in the relay server 106a. After that, the operator terminal 104a sends a GET request to the relay server 106a, and acquires the other data item from the relay server 106a. Thus, in the present embodiment, even when communication with an external apparatus is restricted by a firewall, the maintenance service data can be transmitted and received between the MFP and the operator terminal. In the following description, communication for transmitting and receiving maintenance service data by HTTP communication is referred to as the remote maintenance communication.

Figure 2:
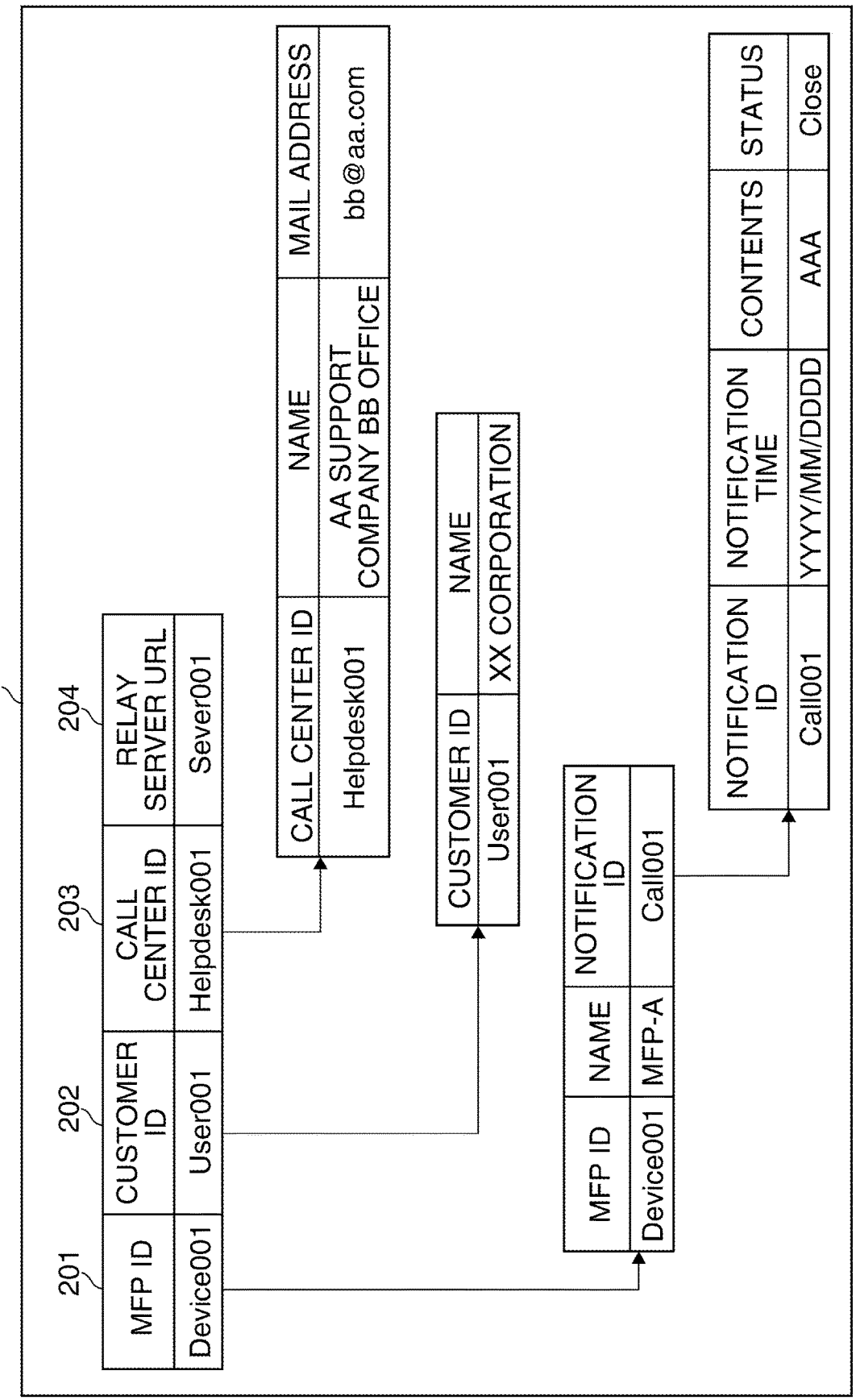
FIG. 2 is a diagram showing an example of an MFP information table managed by a management server appearing in FIG. 1.
Figure 3:
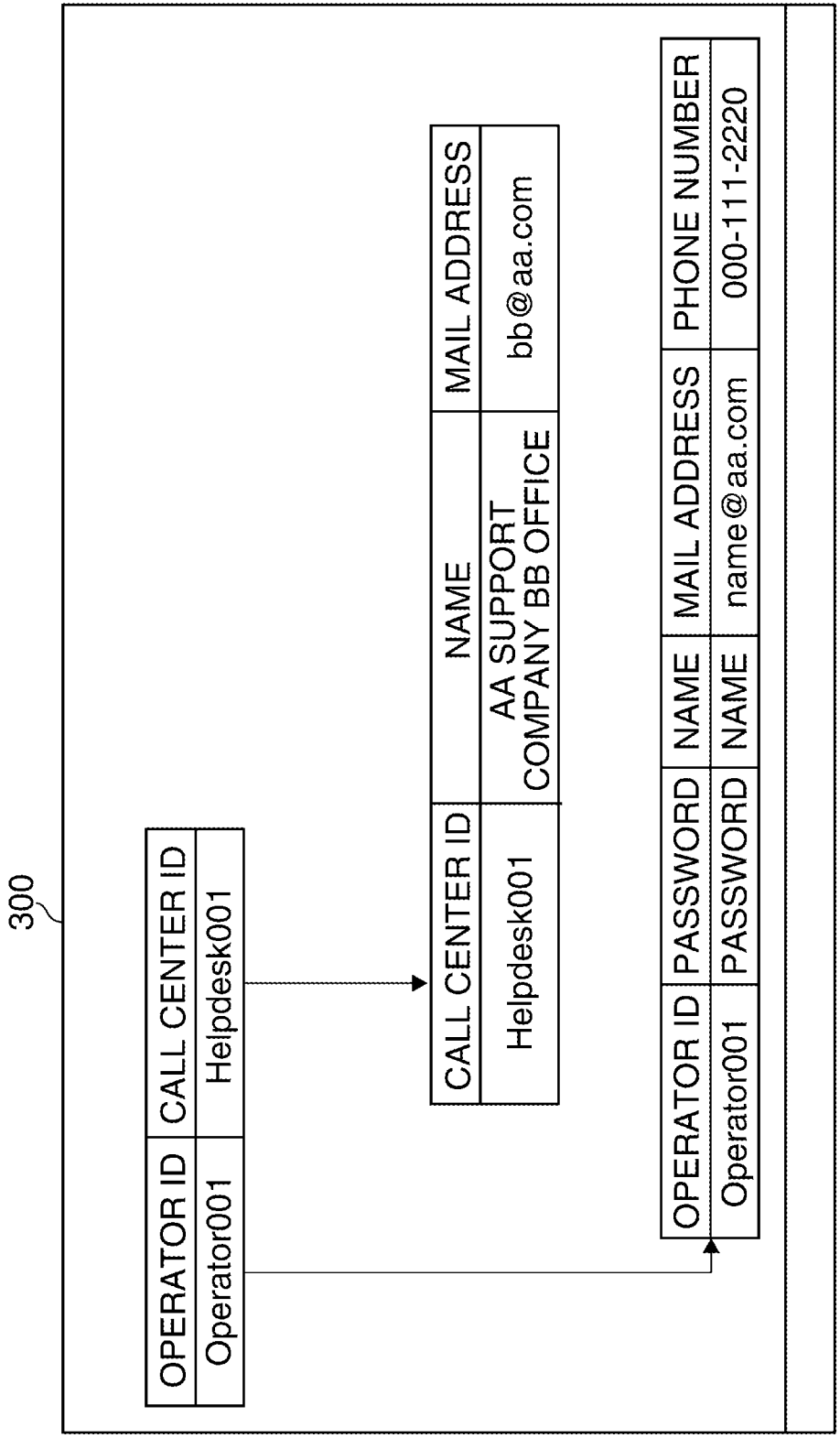
FIG. 3 is a diagram showing an example of an operator information table managed by the management server.

The management server 107 manages an MFP information table 200 shown in FIG. 2, and an operator information table 300 shown in FIG. 3. The management server 107 performs control for assigning, in response to a maintenance service request from an MFP, an operator terminal to the MFP, and authentication processing for each apparatus, based on the MFP information table 200 and the operator information table 300.

Information items concerning the MFPs to be managed by the management server 107 are set in the MFP information table 200. The MFP information table 200 has the items of an MFP ID 201, a customer ID 202, a call center ID 203, a relay server URL 204, and so forth, set therein. For example, as information concerning the MFP 101a, an identifier for identifying the MFP 101a is set as the MFP ID 201, and the name of the MFP 101a, history information of inquiries made by the MFP 101a in the past, etc., are also set in association with the MFP ID 201. Further, an identifier for identifying a user of the MFP 101a is set as the customer ID 202, and an identifier for identifying the call center 105a which provides maintenance service to the MFP 101a is set as the call center ID 203. Further, a URL for accessing the relay server 106a which relays remote maintenance communication between the MFP 101a and an operator terminal of the call center 105a is set as the relay server URL 204. The operator information table 300 has information concerning operators who belong to the call centers 105a and 105b, set therein.

Next, the hardware configuration of the MFPs 101a to 101d will be described. In the present embodiment, the MFPs 101a to 101d have the same configuration, and hence the following description is given of the hardware configuration of the MFP 101a, by way of example.

Figure 4:
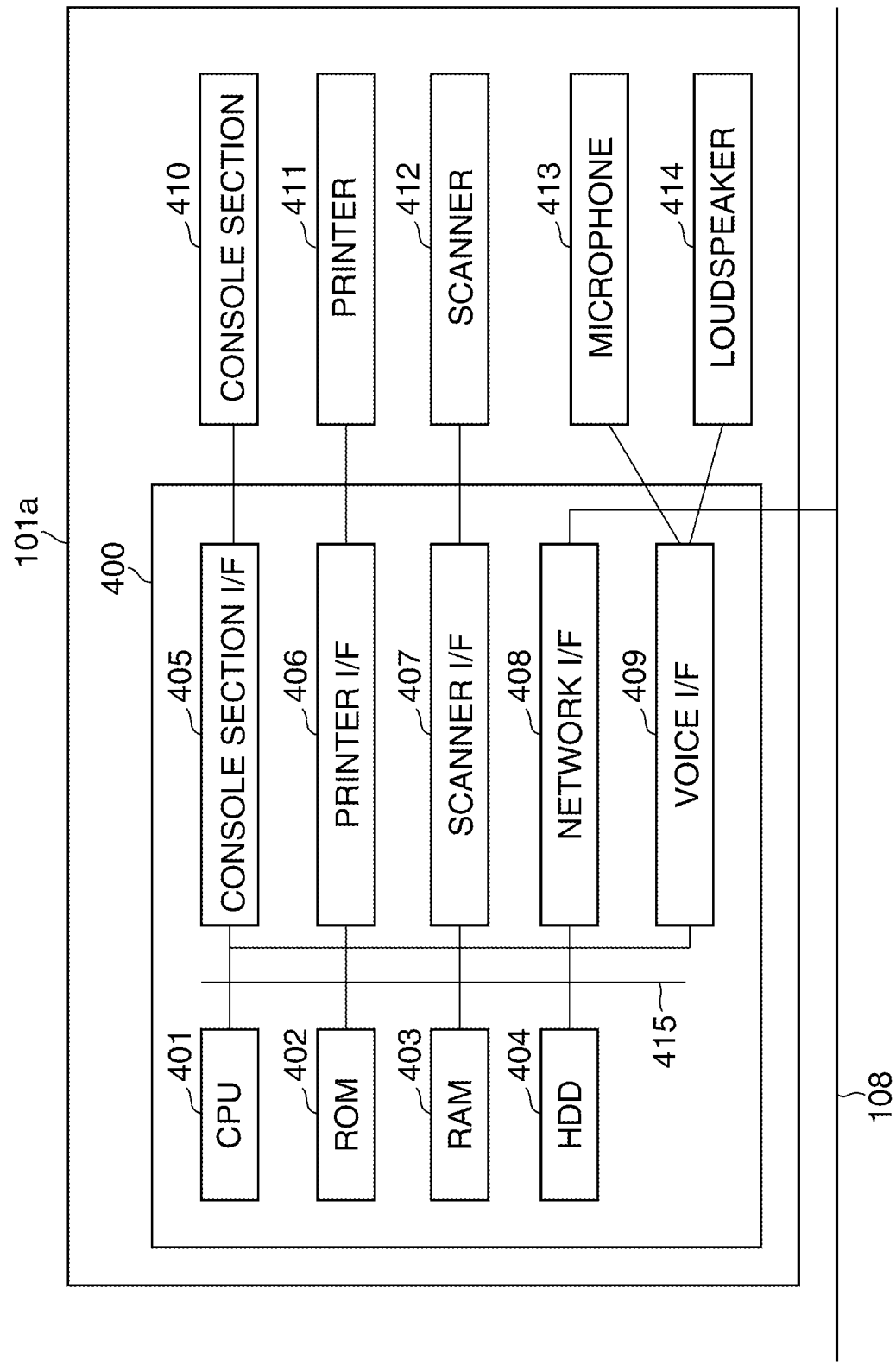
FIG. 4 is a schematic block diagram showing a hardware configuration of an MFP appearing in FIG. 1.

FIG. 4 is a schematic block diagram showing a hardware configuration of the MFP 101a appearing in FIG. 1.

Referring to FIG. 4, the MFP 101a includes a controller 400, a console section 410, a printer 411, a scanner 412, a microphone 413, and a loudspeaker 414. The controller 400 is connected to the console section 410, the printer 411, the scanner 412, the microphone 413, and the loudspeaker 414. The controller 400 includes a CPU 401, a ROM 402, a RAM 403, an HDD 404, a console section interface 405, a printer interface 406, a scanner interface 407, a network interface 408, and a voice interface 409. The CPU 401, the ROM 402, the RAM 403, the HDD 404, the console section interface 405, the printer interface 406, the scanner interface 407, the network interface 408, and the voice interface 409 are interconnected via a system bus 415.

The controller 400 controls the overall operation of the MFP 101a. The CPU 401 performs various controls by executing programs stored in the ROM 402. The ROM 402 stores the programs executed by the CPU 401 and various data. The RAM 403 is used as a work area for the CPU 401, and also used as an area for temporarily storing data. The HDD 404 stores image data and programs. The console section interface 405 performs data communication with the console section 410. The printer interface 406 performs data communication with the printer 411, and for example, the printer interface 406 transmits image data to be printed to the printer 411. The scanner interface 407 performs data communication with the scanner 412, and for example, the scanner interface 407 acquires image data generated by the scanner 412 from the scanner 412. The network interface 408 controls data communication with an external apparatus connected to the Internet 108. The voice interface 409 performs data communication with the microphone 413 and the loudspeaker 414. The console section 410 is a user interface, and includes a liquid crystal display section having a touch panel function, a keyboard, etc., none of which are shown. The printer 411 performs printing on a sheet based on image data received from the printer interface 406. The scanner 412 reads an original placed on an original platen glass, not shown, and generates image data based on the read information. The microphone 413 converts voice to electric signals. The loudspeaker 414 outputs voice.

Next, the hardware configuration of the operator terminals 104a to 104c, the relay servers 106a and 106b, and the management server 107 will be described. Note that in the present embodiment, the operator terminals 104a to 104c, the relay servers 106a and 106b, and the management server 107 have the same configuration, and hence the following description is given of the hardware configuration of the relay server 106a, by way of example.

Figure 5:
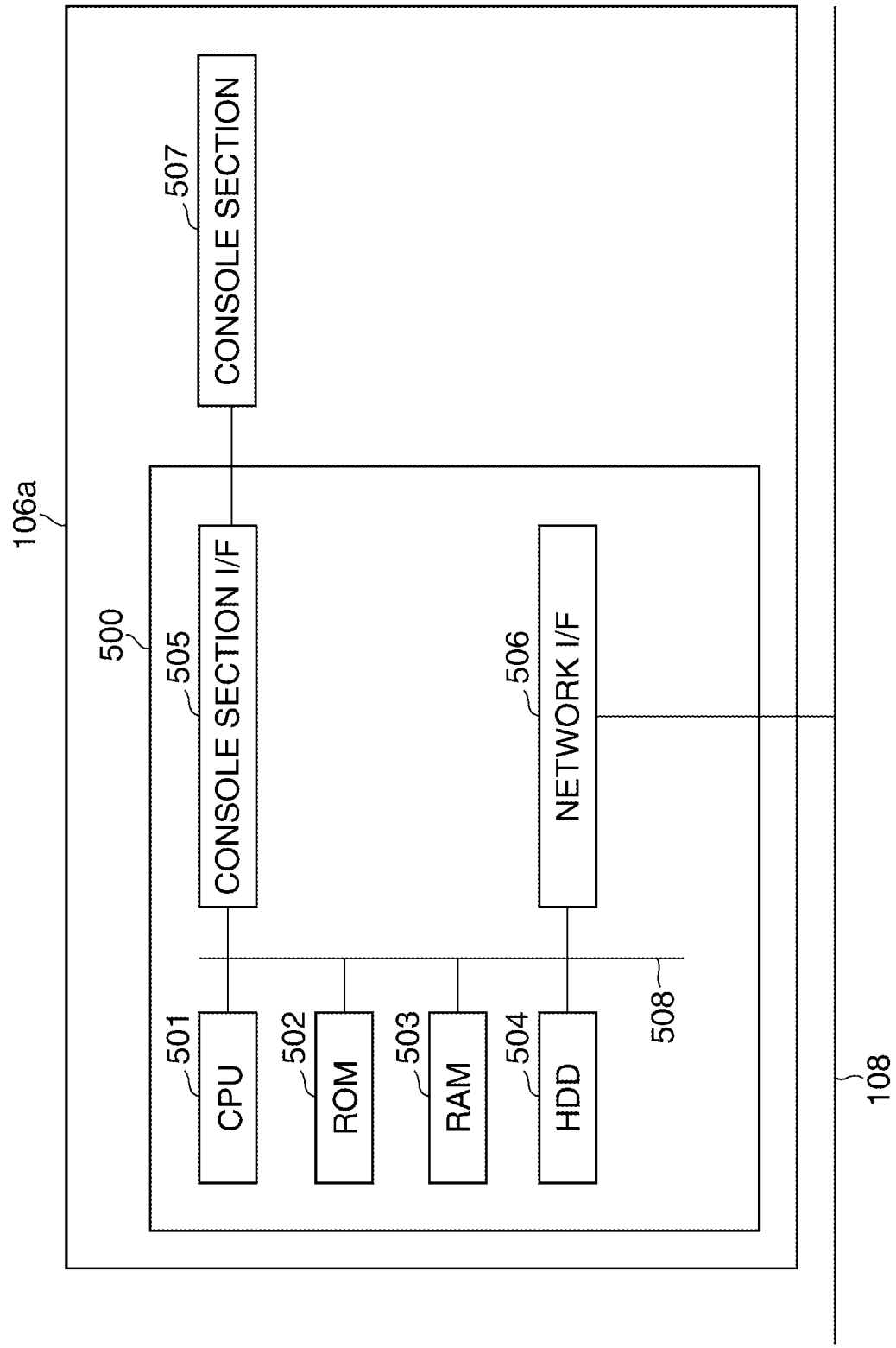
FIG. 5 is a schematic block diagram showing a hardware configuration of a relay server appearing in FIG. 1.

FIG. 5 is a schematic block diagram showing a hardware configuration of the relay server 106a appearing in FIG. 1.

Referring to FIG. 5, the relay server 106a includes a controller 500 and a console section 507, and the controller 500 and the console section 507 are connected to each other. The controller 500 includes a CPU 501, a ROM 502, a RAM 503, an HDD 504, a console section interface 505, and a network interface 506. The CPU 501, the ROM 502, the RAM 503, the HDD 504, the console section interface 505, and the network interface 506 are interconnected via a system bus 508.

The controller 500 controls the overall operation of the relay server 106a. The CPU 501 controls modules of a software module group 600, referred to hereinafter with reference to FIG. 6, by executing programs stored in the ROM 502. The ROM 502 stores the programs executed by the CPU 501 and various data. The RAM 503 is used as a work area for the CPU 501, and is also used as an area for temporarily storing data. The HDD 504 stores programs, setting data, etc. The console section interface 505 performs data communication with the console section 507. The network interface 506 controls data communication with an external apparatus connected to the Internet 108. The console section 507 is a user interface, and includes a liquid crystal display section having a touch panel function, a keyboard, a mouse, etc., none of which are shown.

Next, the software configuration of the relay servers 106a and 106b will be described. In the present embodiment, the relay servers 106a and 106b have the same software configuration, and hence the following description is given of the software configuration of the relay server 106a, by way of example.

Figure 6:
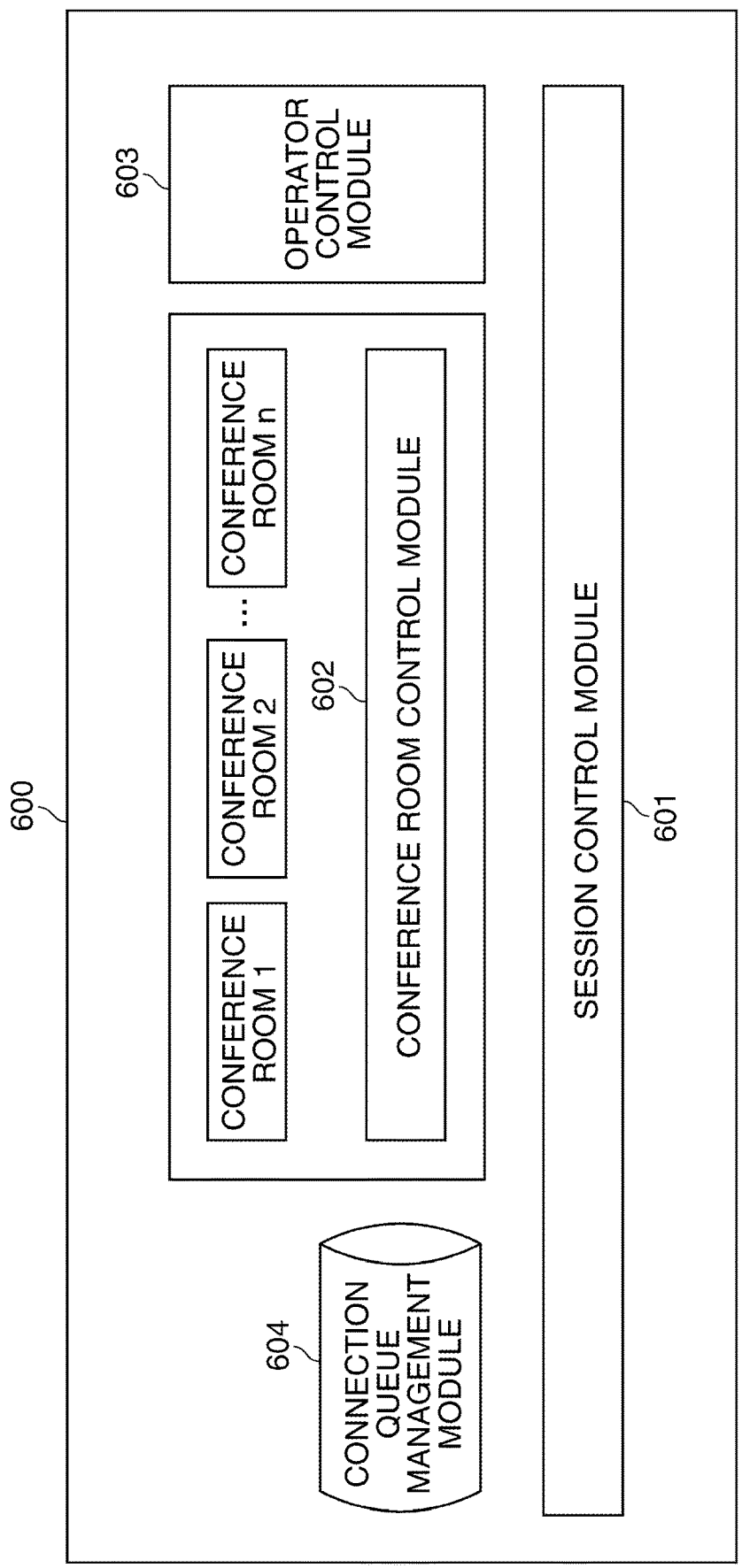
FIG. 6 is a schematic block diagram of a software module group of the relay server appearing in FIG. 1.

FIG. 6 is a schematic block diagram of the software module group 600 of the relay server 106a appearing in FIG. 1.

Referring to FIG. 6, the software module group 600 includes a session control module 601, a conference room control module 602, an operator control module 603, and a connection queue management module 604. The modules of the software module group 600 are controlled by the CPU 501 of the relay server 106a executing the programs stored in the ROM 502 or the like.

The session control module 601 controls establishment and disconnection of remote maintenance communication between an MFP and an operator terminal. The conference room control module 602 controls the reservation and release of storage areas for storing maintenance service data. In the following description, a storage area for storing maintenance service data is referred to as the "conference room", and in the present embodiment, a plurality of conference rooms are provided in the HDDs 504 or the like of the relay servers 106a and 106b.

Here, the "conference room" in the present embodiment is a virtual space existing on the relay server. This conference room is a storage area identified by a URL (Uniform Resource Locator) designated by the MFP or the operator terminal, out of storage areas in a storage section included in each relay server. In a case where data is transmitted from an operator terminal to an MFP, the operator terminal stores (posts) the data to be transmitted in a storage area (conference room) identified by the URL. On the other hand, the MFP accesses the storage area using the URL, and acquires (gets) the data stored by the POST request sent by the operator terminal. In a case where data is transmitted from an MFP to an operator terminal, the MFP posts the data in the conference room, and the posted data is got by the operator terminal.

In the present embodiment, a state of data exchange being performed between an MFP and an operator terminal using a common conference room is expressed as a state of a session being maintained between them, as deemed appropriate.

The operator control module 603 controls the reservation and release of an operator terminal. The connection queue management module 604 holds a connection request received from an MFP, for putting the MFP on standby for connection, in a case where there is no available conference room in the relay server 106a.

Next, a description will be given of establishment and disconnection of remote maintenance communication in the remote maintenance system 100. In the following description, establishment and disconnection of remote maintenance communication between the MFP 101a in the user environment 102a and the operator terminal 104a in the call center 105a will be described, by way of example. Note that a process similar to the process described below is performed between the other MFPs and the other operator terminals in the remote maintenance system 100.

Figure 7:
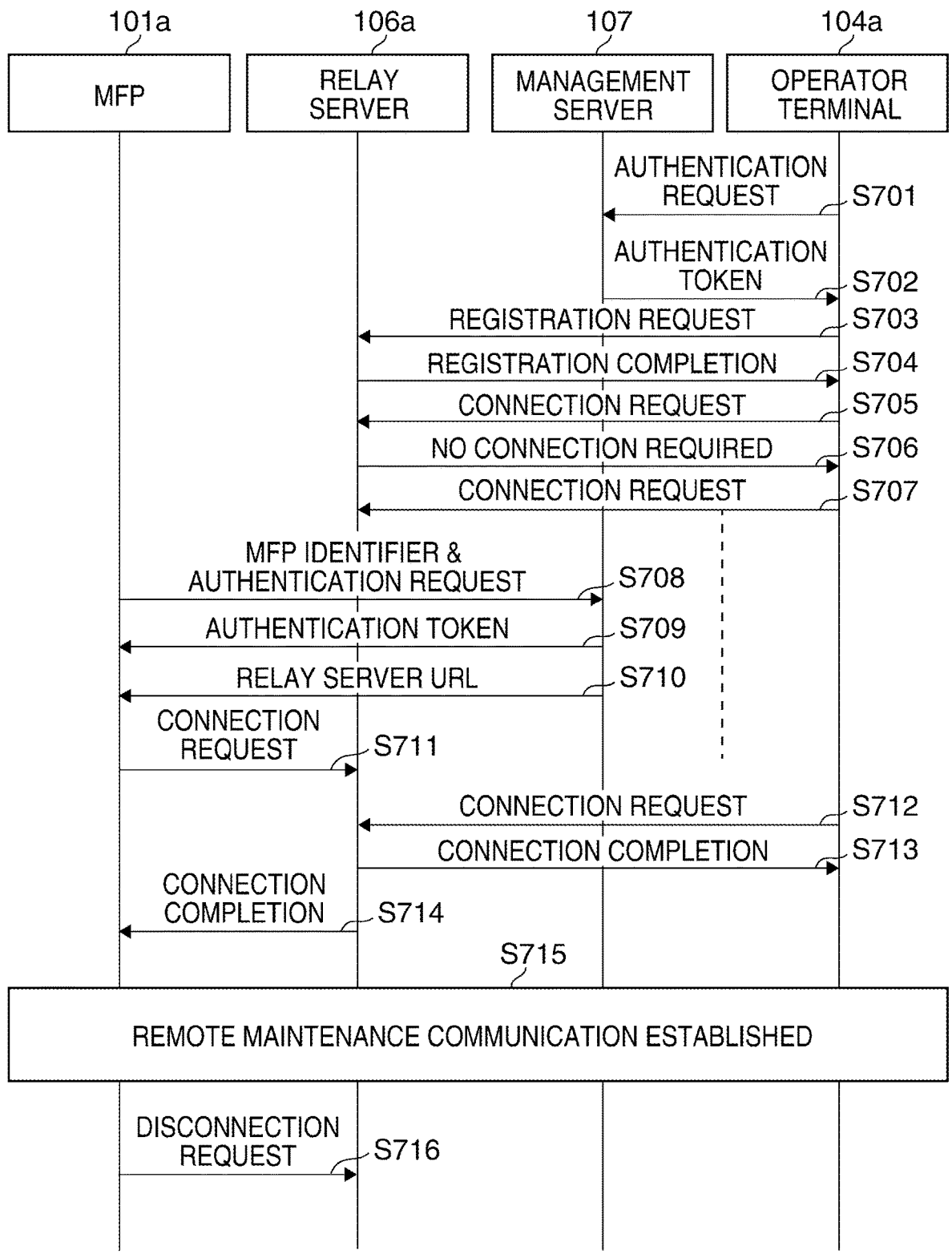
FIG. 7 is a sequence diagram of a remote maintenance communication establishment process performed by the remote maintenance system shown in FIG. 1.

FIG. 7 is a sequence diagram of a remote maintenance communication establishment process performed by the remote maintenance system 100 shown in FIG. 1.

The process in FIG. 7 is performed when an operator of the operator terminal 104a has performed an operation for completing preparation for accepting a remote maintenance operation request.

Referring to FIG. 7, first, the operator terminal 104a sends an authentication request to the management server 107 in response to the operation for completing preparation for accepting a remote maintenance operation request (step S701). The management server 107 performs processing for authenticating the operator terminal 104a based on the received authentication request. Then, the operator terminal 104a acquires an authentication token including an authentication result from the management server 107 (step 702). The operator terminal 104a transmits the acquired authentication token to the relay server 106a, and further, sends a registration request to the relay server 106a (step S703).

The relay server 106a checks the authentication result included in the received authentication token, and if the authentication of the operator terminal 104a is successful, the relay server 106a registers the operator terminal 104a, and sends a response indicating registration completion (step S704).

When the registration completion is notified by the relay server 106a, the operator terminal 104a sends a request for connecting to an MFP in the user environment 102a to the relay server 106a (step S705).

Upon receipt of the connection request from the operator terminal 104a, the relay server 106a determines whether or not a request for connecting to an operator terminal has been received from an MFP in the user environment 102a. If no connection request has been received from any MFP in the user environment 102a, the relay server 106a sends a response indicating no connection required, notifying that it is not required to connect to an MFP in the user environment 102a, to the operator terminal 104a (step S706).

In a case where the response from the relay server 106a indicates no connection required, the operator terminal 104a sends a connection request to the relay server 106a again after the lapse of a predetermined time period (step S707). The operator terminal 104a periodically sends a connection request to the relay server 106a until a connection completion notification is received from the relay server 106a, as in a step S713, referred to hereinafter.

When an instruction for starting remote maintenance is provided by a user's operation of the console section 410, the MFP 101a transmits the identifier of the MFP 101a to the management server 107, and further, sends an authentication request to the management server 107 (step 708). In the present embodiment, the start of remote maintenance is instructed by a simple operation, such as an operation for pressing a remote maintenance start button, not shown, displayed on the console section 410. The management server 107 performs authentication processing for the MFP 101a based on the MFP information table 200 and the received identifier of the MFP 101a, and further, identifies a relay server URL associated with the MFP 101a. The relay server URL associated with the MFP 101a is a URL for accessing the relay server 106a. The MFP 101a acquires, from the management server 107, an authentication token including the authentication result (step S709), and then the identified relay server URL (step S710). The MFP 101a accesses the relay server 106a indicated by the acquired relay server URL, and transmits the authentication token to the relay server 106a. Further, the MFP 101a sends a request for connecting to an operator terminal to the relay server 106a (step 711).

Upon receipt of the connection request from the MFP 101a, the relay server 106a reserves a conference room which is a storage area for storing the maintenance service data. The process concerning the reservation and release of a conference room, performed by the relay server 106a, will be described hereinafter. Further, the relay server 106a holds the connection request received from the MFP 101a, and waits until a connection request is received from an operator terminal of the call center 105a. In the following description, a state in which the relay server 106a waits for a connection request from an operator terminal while holding a connection request from an MFP is referred to as a "first operator terminal connection-waiting state".

After that, upon receipt of a connection request from the operator terminal 104a while holding the connection request from the MFP 101a (step S712), the relay server 106a notifies the connection completion to each of the operator terminal 104a and the MFP 101a (steps S713 and S714). In the remote maintenance system 100, for example, the relay server 106a makes a POST request for storing information indicating the connection completion in the reserved conference room, and the MFP 101a and the operator terminal 104a each send a GET request for acquiring the information indicating the connection completion from the conference room, whereby the connection completion is notified to each of the MFP 101a and the operator terminal 104a.

Then, the remote maintenance communication between the MFP 101a and the operator terminal 104a is established in the remote maintenance system 100 (step S715). When the remote maintenance communication is established, the MFP 101a and the operator terminal 104a are enabled to transmit and receive maintenance service data to and from each other via the conference room in the relay server 106a. For example, the MFP 101a causes a communication request of maintenance service data to be stored in the conference room. The communication request is managed e.g. as a predetermined flag. On the other hand, the operator terminal 104a periodically checks whether or not a communication request has been stored in the conference room, and if a communication request has been stored in the conference room, the operator terminal 104a starts communication of maintenance service data with the MFP 101*a*. Further, as another method, the operator terminal 104*a* may cause a communication request to be stored in the conference room, and communication of maintenance service data between the MFP 101*a* and the operator terminal 104*a* may be started when the MFP 101*a* accesses the conference room.

The connection completion notification from the relay server 106*a* to the MFP 101*a* and the operator terminal 104*a* can be realized, as described above, by a POST request for storing information indicating the connection completion in the conference room. The MFP 101*a* and the operator terminal 104*a* can confirm connection completion by sending a GET request for acquiring the connection completion information stored in the conference room by the POST request. By doing this, the relay server 106*a* does not perform active data transmission to the MFP 101*a* and the operator terminal 104*a*, and hence even when there are firewalls between the relay server 106*a*, and the MFP 101*a* and the operator terminal 104*a*, it is possible to perform data communication.

Then, if a disconnection request is received from one of the MFP 101*a* and the operator terminal 104*a*, the MFP 101*a* in the illustrated example (step S716), the relay server 106*a* disconnects the remote maintenance communication between the MFP 101*a* and the operator terminal 104*a*, followed by terminating the present process.

Next, a description will be given of a process performed in a case where a connection request for connecting to an operator terminal is sent from the MFPs 101*b* or 101*c* to the relay server 106*a* in a state in which the remote maintenance communication between the MFP 101*a* and the operator terminal 104*a* has been established.

Figure 8:
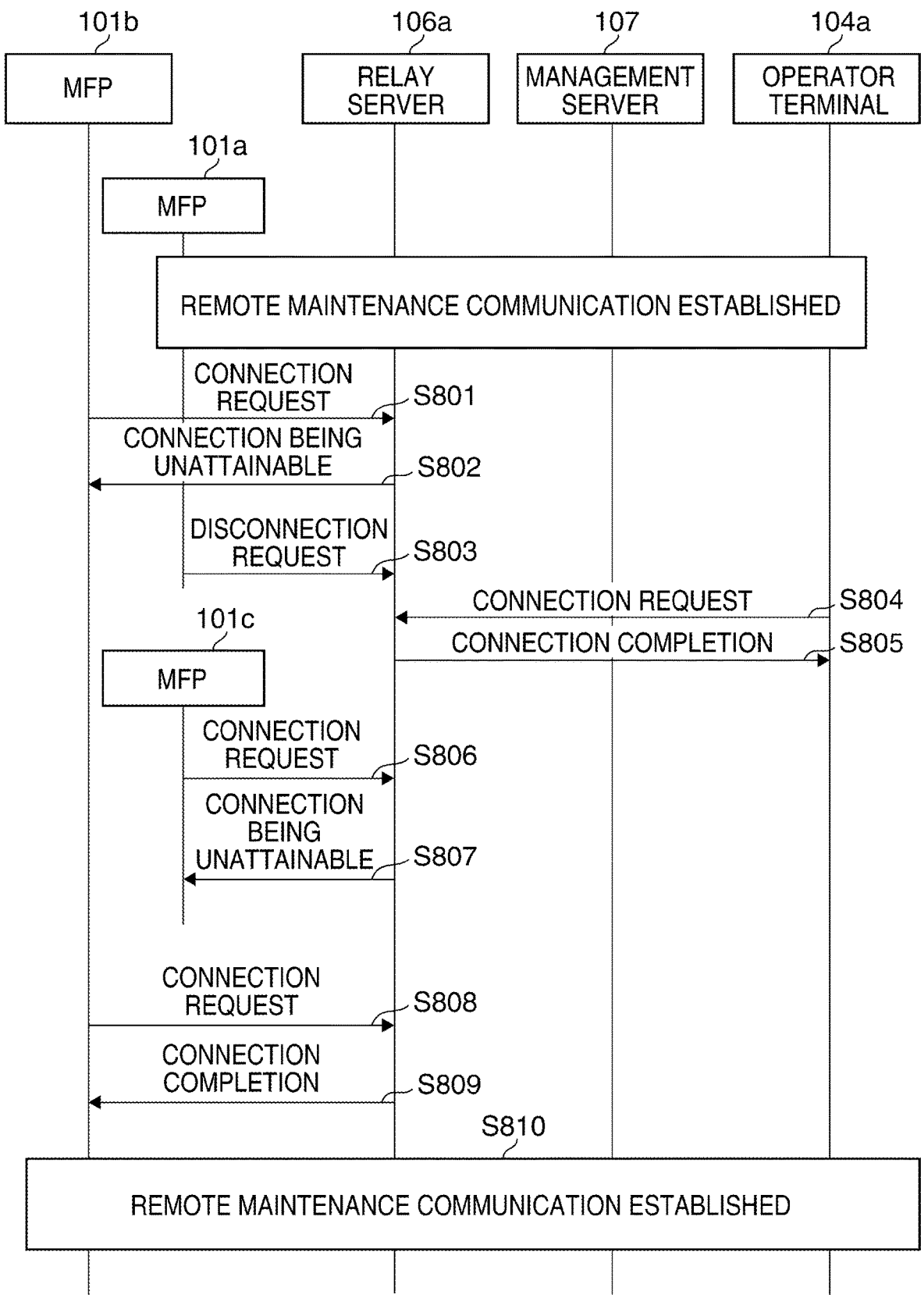
FIG. 8 is a sequence diagram of a connection request-queuing process performed by the remote maintenance system shown in FIG. 1.

FIG. 8 is a sequence diagram of a connection request-queuing process performed by the remote maintenance system 100 shown in FIG. 1.

The process in FIG. 8 is performed assuming that all operator terminals of the call center 105*a* have established the remote maintenance communication, and that, for example, the operator terminal 104*a* has established the remote maintenance communication with the MFP 101*a*.

Referring to FIG. 8, upon receipt of a connection request from the MFP 101*b* (step S801), the relay server 106*a* sends a response indicating that connection cannot be made (connection being unattainable), to the MFP 101*b* (step S802). Further, the relay server 106*a* causes the connection queue management module 604 to store the connection request received from the MFP 101*b*, to thereby queue the connection request received from the MFP 101*b*. Then, if a disconnection request is received from the MFP 101*a* having established the remote maintenance communication via the relay server 106*a* (step S803), the relay server 106*a* disconnects the remote maintenance communication between the MFP 101*a* and the operator terminal 104*a*. When the operator who operates the operator terminal 104*a*, which has been disconnected from the remote maintenance communication, performs an operation for completing preparation for accepting a remote maintenance operation request so as to cope with the next connection request, the steps S701 to S705 appearing in FIG. 7 are executed by the operator terminal 104*a*.

Further, the relay server 106*a* remains on standby until a connection request is received from an operator terminal. In the following description, a state in which the relay server 106*a* waits for a connection request from an operator terminal with a connection request from an MFP being queued by the connection queue management module 604 is referred to as a "second operator terminal connection-waiting state". When the connection request is received e.g. from the operator terminal 104*a* in the state in which the connection request from the MFP 101*b* has been queued by the connection queue management module 604 (step S804), the relay server 106*a* notifies the operator terminal 104*a* of the connection completion (step S805). Further, the relay server 106*a* notifies the operator terminal 104*a* of information concerning the connection request received from the MFP 101*b*. The operator who operates the operator terminal 104*a* notifies, based on the information acquired from the relay server 106*a*, the user of the MFP 101*b* that the preparation for starting a maintenance operation is completed. If the relay server 106*a* receives a connection request from an MFP other than the MFP 101*b*, e.g. from the MFP 101*c*, in the state in which the connection request from the MFP 101*b* is in queue (step S806), the relay server 106*a* sends a response indicating that connection cannot be made (connection being unattainable), to the MFP 101*c* (step S807). After that, when the relay server 106*a* receives a connection request from the MFP 101*b* again (step S808), the relay server 106*a* notifies the MFP 101*b* of the connection completion (step S809). With this, the remote maintenance communication between the MFP 101*b* and the operator terminal 104*a* is established in the remote maintenance system 100 (step S810), whereby the MFP 101*b* and the operator terminal 104*a* are enabled to transmit and receive maintenance service data to and from each other via the relay server 106*a*.

Figure 9:
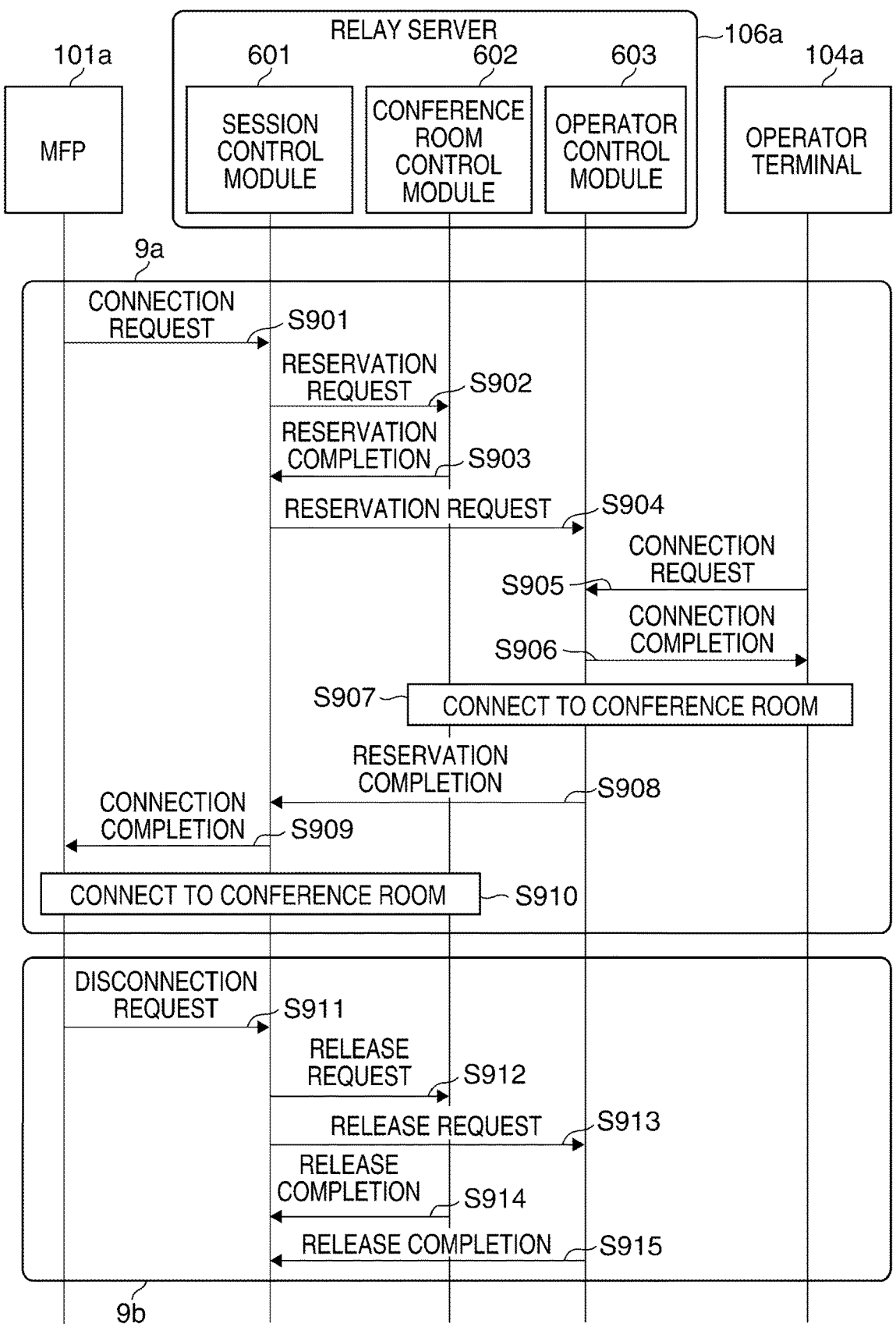
FIG. 9 is a sequence diagram of a conference room control process performed by the relay server.

FIG. 9 is a sequence diagram of a conference room control process performed by the relay server 106*a* appearing in FIG. 1.

In a sequence 9*a* in FIG. 9, when the relay server 106*a* receives a connection request from the MFP 101*a* (step S901) (see e.g. the step S711 in FIG. 7), the session control module 601 sends a request for reserving a conference room, to the conference room control module 602 (step S902). Then, in the relay server 106*a*, when a conference room is reserved, the conference room control module 602 sends a response indicating completion of the reservation of the conference room to the session control module 601 (step S903). Then, in the relay server 106*a*, to assign an operator terminal to the MFP 101*a*, the session control module 601 sends a request for reserving an operator terminal, to the operator control module 603 (step S904). In response to the operator terminal reservation request, in the relay server 106*a*, the operator control module 603 waits until a connection request is received from an operator terminal of the call center 105*a*. When the connection request is received from an operator terminal of the call center 105*a*, e.g. from the operator terminal 104*a* (step S905) (see e.g. the step S712 in FIG. 7), the relay server 106*a* assigns the operator terminal 104*a* to the MFP 101*a*. Then, the relay server 106*a* notifies the operator terminal 104*a* of the connection completion (step S906) (see e.g. the step S713 in FIG. 7). Then, the relay server 106*a* causes the operator terminal 104*a* to be connected to the reserved conference room (step S907).

Then, in the relay server 106*a*, the operator control module 603 sends a response indicating completion of the reservation of the operator terminal, to the session control module 601 (step S908). Then, the relay server 106*a* notifies the MFP 101*a* of the connection completion (step S909) (see e.g. the step S714 in FIG. 7). Then, the relay server 106*a* causes the MFP 101*a* to be connected to the reserved conference room (step S910). With this, the remote maintenance communication between the MFP 101*a* and the operator terminal 104*a* is established.

After that, in a sequence 9b in FIG. 9, when the relay server 106a receives a disconnection request from the MFP 101a (step S911) (see e.g. the step S716 in FIG. 7), the session control module 601 sends a request for releasing the conference room, to the conference room control module 602 (step S912). Further, the session control module 601 sends a request for releasing the operator terminal, to the operator control module 603 (step S913). Then, in the relay server 106a, the conference room control module 602 releases the conference room according to the conference room release request, and sends a response indicating completion of the release, to the session control module 601 (step S914). Further, in the relay server 106a, the operator control module 603 disconnects the communication with the operator terminal 104a according to the operator terminal release request, and sends a response indicating completion of the release, to the session control module 601 (step S915). With this, the remote maintenance communication between the MFP 101a and the operator terminal 104a is disconnected.

Next, a description will be given of a process for reserving and releasing a conference room when a connection request for connecting to an operator terminal is sent from the MFP 101b to the relay server 106a in a state in which the remote maintenance communication between the MFP 101a and the operator terminal 104a has been established.

Figure 10:
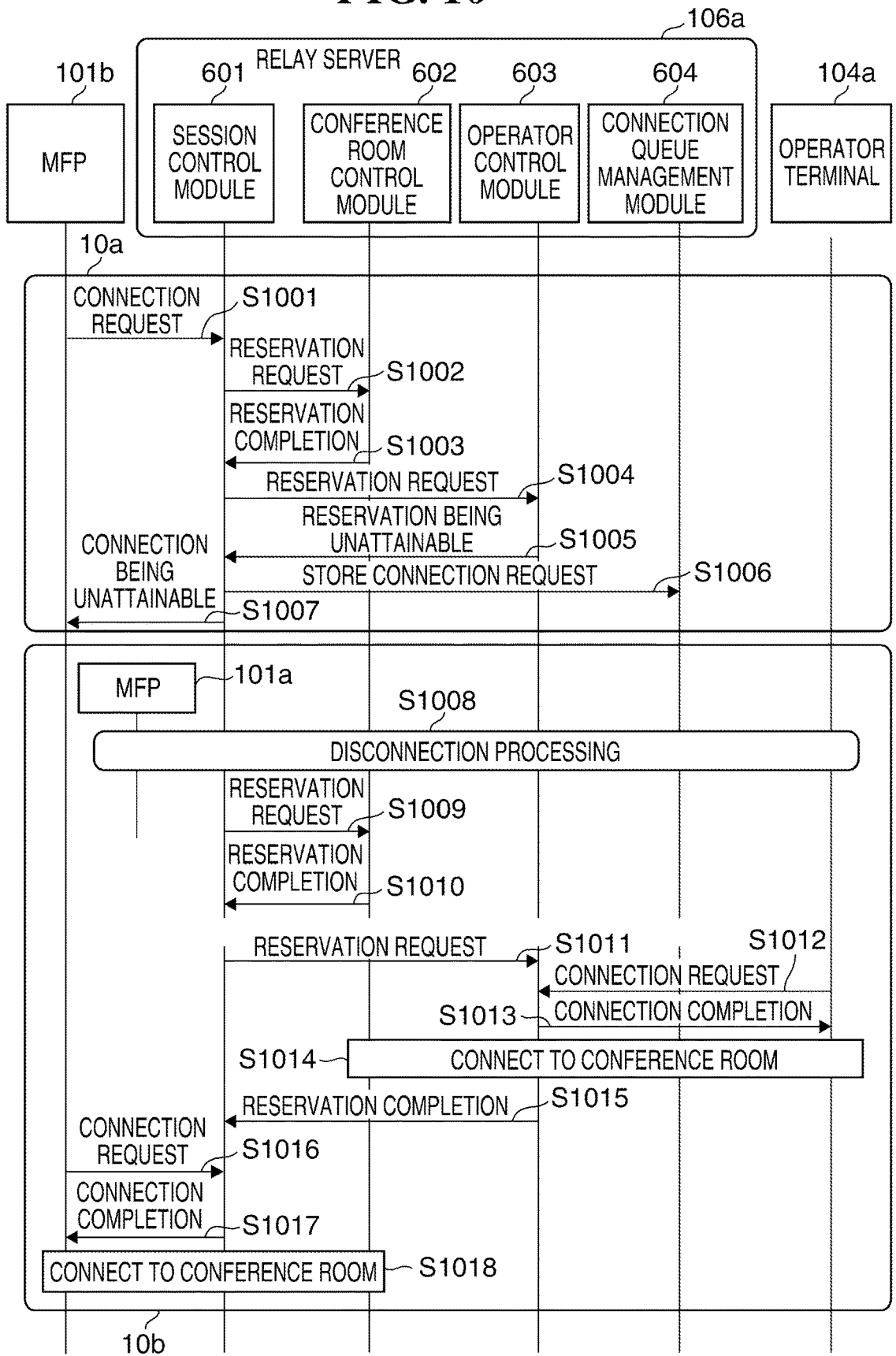
FIG. 10 is a sequence diagram of a conference room control process performed by the relay server when a connection request is in queue.

FIG. 10 is a sequence diagram of a conference room control process performed by the relay server 106a appearing in FIG. 1 when a connection request is in queue.

Similar to the process in FIG. 8, the process in FIG. 10 is also performed assuming that all operator terminals of the call center 105a have established the remote maintenance communication, and that, for example, the operator terminal 104a has established the remote maintenance communication with the MFP 101a.

In a sequence 10a in FIG. 10, when the relay server 106a receives a connection request from the MFP 101b (step S1001) (see e.g. the step S801 in FIG. 8), the session control module 601 sends a request for reserving a conference room, to the conference room control module 602 (step S1002). Then, in the relay server 106a, when a conference room is reserved, the conference room control module 602 sends a response indicating completion of the reservation of the conference room, to the session control module 601 (step S1003). Then, in the relay server 106a, to assign an operator terminal to the MFP 101b, the session control module 601 sends a request for reserving an operator terminal, to the operator control module 603 (step S1004). If all operator terminals of the call center 105a have established the remote maintenance communication, in the relay server 106a, the operator control module 603 sends a response indicating that no operator terminal can be reserved (reservation being unattainable), to the session control module 601 (step S1005). Then, in the relay server 106a, the session control module 601 causes the connection queue management module 604 to store the connection request from the MFP 101b (step S1006). Further, the relay server 106a notifies the MFP 101b that connection cannot be made (connection being unattainable) (step S1007) (see e.g. the step S802 in FIG. 8).

After that, in a sequence 10b in FIG. 10, upon receipt of a disconnection request from the MFP 101a (see e.g. the step S803 in FIG. 8), the relay server 106a performs disconnection processing for disconnecting the remote maintenance communication between the MFP 101a and the operator terminal 104a (step S1008). Then, in the relay server 106a, the session control module 601 acquires the connection request from the MFP 101b, which has been queued by the connection queue management module 604. Then, in the relay server 106a, the session control module 601 sends a request for reserving a conference room, to the conference room control module 602 (step S1009). Then, in the relay server 106a, when a conference room is reserved, the conference room control module 602 sends a response indicating completion of the reservation of the conference room, to the session control module 601 (step S1010). Then, in the relay server 106a, to assign an operator terminal to the MFP 101b, the session control module 601 sends a request for reserving an operator terminal, to the operator control module 603 (step S1011). When a connection request from an operator terminal of the call center 105a, e.g. from the operator terminal 104a, is received (step S1012) (see e.g. the step S804 in FIG. 8), the relay server 106a assigns the operator terminal 104a to the MFP 101b. Then, the relay server 106a notifies the operator terminal 104a of the connection completion (step S1013) (see e.g. the step S805 in FIG. 8). Further, the relay server 106a causes the operator terminal 104a to be connected to the reserved conference room (step S1014).

Then, in the relay server 106a, the operator control module 603 sends a response indicating completion of the reservation of the operator terminal, to the session control module 601 (step S1015). Then, when the relay server 106a receives a connection request from the MFP 101b again in the state in which the connection request from the MFP 101b is in queue (step S1016) (see e.g. the step S808 in FIG. 8), the relay server 106a notifies the MFP 101b of the connection completion (step S1017) (see e.g. the step S809 in FIG. 8). Further, the relay server 106a causes the MFP 101b to be connected to the assigned conference room (step S1018). After that, the relay server 106a terminates the present process.

Next, the operations performed by the MFPs 101a to 101d will be described. Note that in the present embodiment, the same operations are performed in the MFPs 101a to 101d, and hence the following description is given of the operation control performed by the MFP 101a, by way of example.

Figure 11:
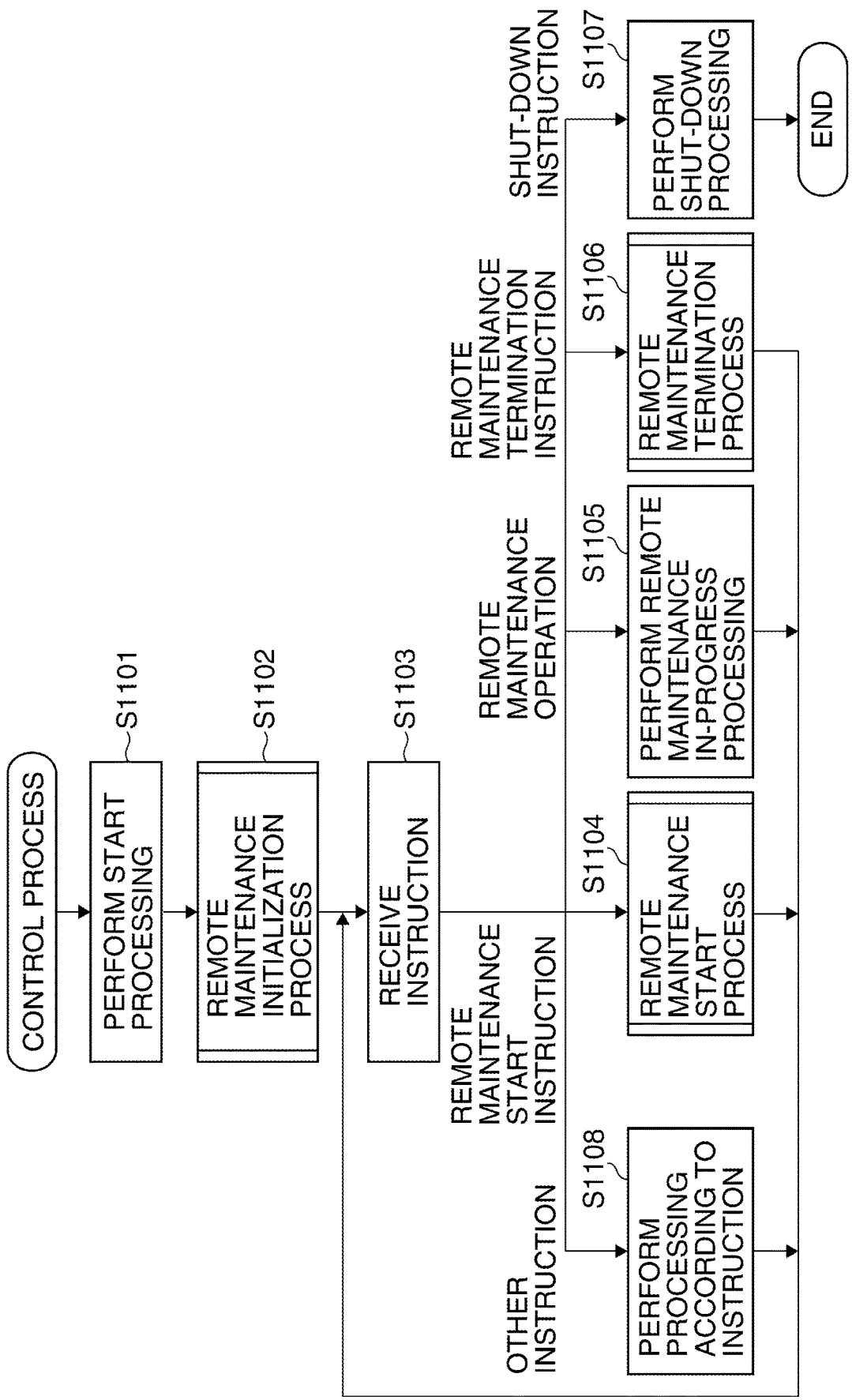
FIG. 11 is a flowchart of a control process performed by an MFP appearing in FIG. 1.

FIG. 11 is a flowchart of a control process performed by the MFP 101a appearing in FIG. 1.

The process in FIG. 11 is performed when an instruction for starting the MFP 101a is provided by a user.

Referring to FIG. 11, the MFP 101a performs start processing according to the start instruction (step S1101), and performs a remote maintenance initialization process described hereinafter with reference to FIG. 12 (step S1102). Then, the MFP 101a receives an instruction input by operating the console section 410 (step S1103).

If a remote maintenance start instruction is received in the step S1103, the MFP 101a performs a remote maintenance starting process described hereinafter with reference to FIG. 14 (step S1104), and returns to the step S1103.

If a remote maintenance operation is performed in the step S1103, the MFP 101a performs remote maintenance in-progress processing (step S1105), and returns to the step S1103.

If a remote maintenance termination instruction is received in the step S1103, the MFP 101a performs a remote maintenance termination process described hereinafter with reference to FIG. 15 (step S1106), and returns to the step S1103.

If a shut-down instruction for shutting down the MFP 101a is received in the step S1103, the MFP 101a performs processing for shutting down the MFP 101a (step S1107), followed by terminating the present process.

If an instruction other than the above (other instruction) is received in the step S1103, the MFP 101a performs processing according to the received instruction (step S1108), and returns to the step S1103.

Figure 12:
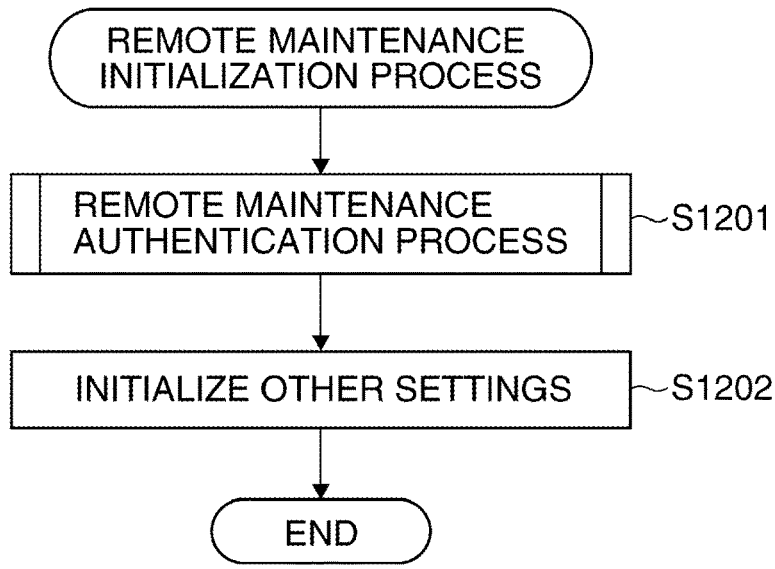
FIG. 12 is a flowchart of a remote maintenance initialization process performed in a step in FIG. 11.

FIG. 12 is a flowchart of the remote maintenance initialization process performed in the step S1102 in FIG. 11.

Referring to FIG. 12, the MFP 101a performs a remote maintenance authentication process described hereinafter with reference to FIG. 13 (step S1201). Then, the MFP 101a initializes other settings for performing remote maintenance (step S1202), followed by terminating the present process.

Figure 13:
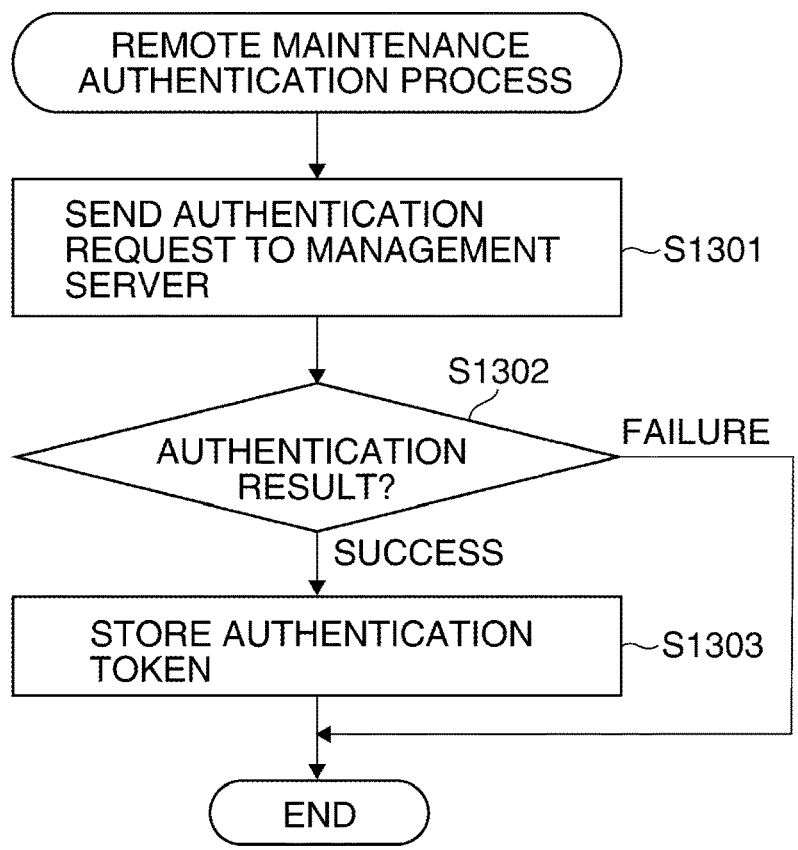
FIG. 13 is a flowchart of a remote maintenance authentication process performed in a step in FIG. 12.

FIG. 13 is a flowchart of the remote maintenance authentication process performed in the step S1201 in FIG. 12.

Referring to FIG. 13, the MFP 101a transmits the identifier of the MFP 101a to the management server 107, and further, sends an authentication request to the management server 107 (step S1301) (see e.g. the step S708 in FIG. 7). The MFP 101a acquires an authentication token including an authentication result, and the relay server URL for accessing the relay server 106a, from the management server 107 (see e.g. the steps S709 and S710 in FIG. 7). Then, the MFP 101a determines whether or not the authentication result included in the acquired authentication token indicates a success or a failure (step S1302).

If it is determined in the step S1302 that the authentication result indicates a failure, the MFP 101a terminates the present process. On the other hand, if it is determined in the step S1302 that the authentication result indicates a success, the MFP 101a stores the acquired authentication token and relay server URL e.g. in the HDD 404 (step S1303), followed by terminating the present process.

Figure 14:
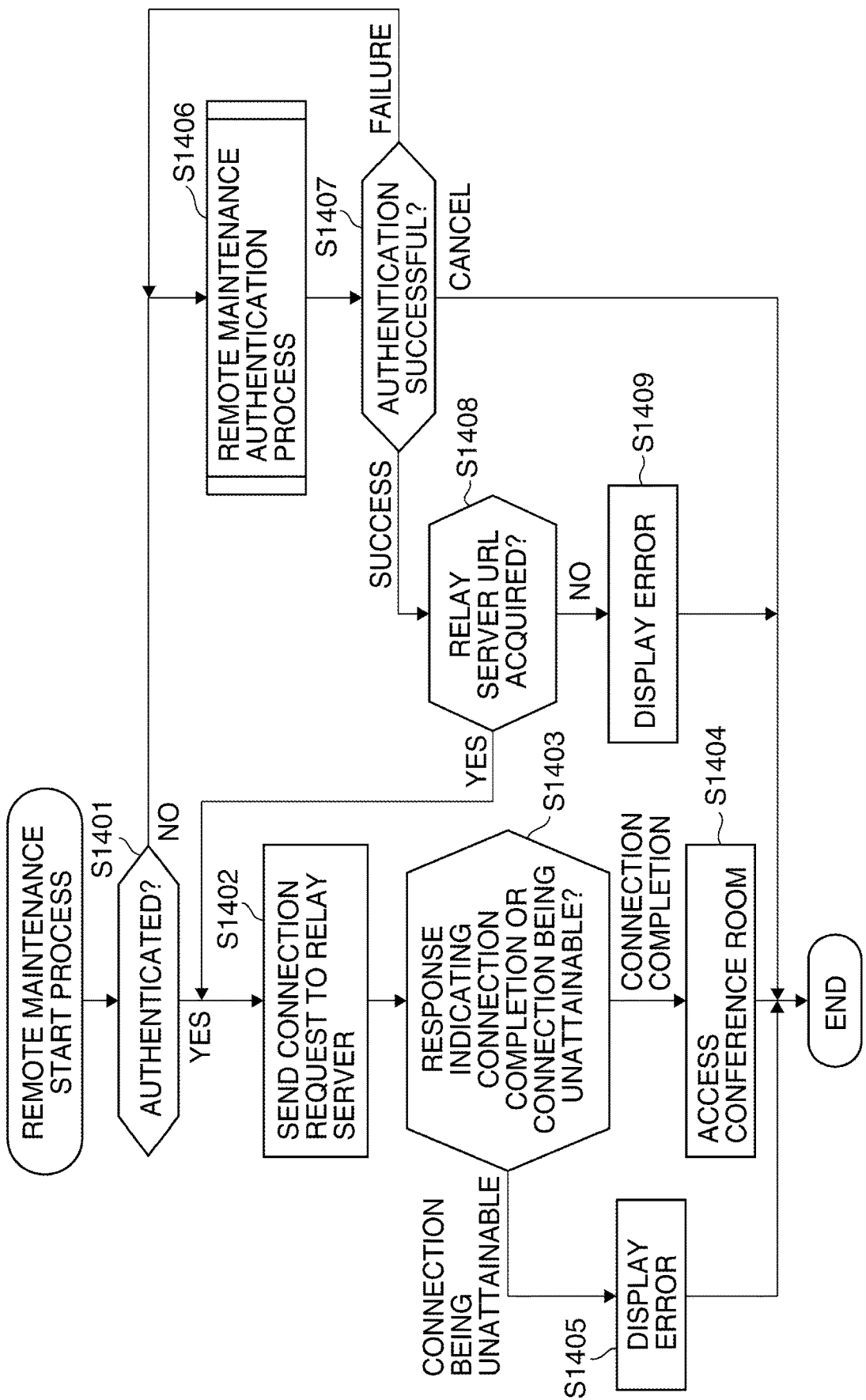
FIG. 14 is a flowchart of a remote maintenance start process performed in a step in FIG. 11.

FIG. 14 is a flowchart of the remote maintenance start process performed in the step S1104 in FIG. 11.

Referring to FIG. 14, the MFP 101a determines whether or not the MFP 101a has been subjected to authentication by the management server 107 (step S1401).

If it is determined in the step S1401 that the MFP 101a has already been subjected to authentication by the management server 107, the MFP 101a accesses the relay server 106a based on the relay server URL acquired from the management server 107. Then, the MFP 101a transmits the authentication token to the relay server 106a, and further, sends a connection request to the relay server 106a (step S1402) (see e.g. the step S711 in FIG. 7). Upon receipt of a response from the relay server 106a to the above-mentioned connection request, the MFP 101a determines whether the received response indicates the connection completion or the connection being unattainable (step S1403).

If it is determined in the step S1403 that the response indicates the connection completion (see e.g. the step S714 in FIG. 7), the MFP 101a accesses the conference room reserved by the relay server 106a (step S1404). With this, the MFP 101a is enabled to transmit and receive maintenance service data to and from the assigned operator terminal via the conference room. After that, the MFP 101a terminates the present process.

If it is determined in the step S1403 that the response indicates the connection being unattainable (see e.g. the steps S802 and S807 in FIG. 8), the MFP 101a displays an error notification to the effect that the connection to the relay server 106a has failed, on the console section 410 (step S1405). After that, the MFP 101a terminates the present process.

If it is determined in the step S1401 that the MFP 101a has not been subjected to authentication by the management server 107 yet, the MFP 101a performs the remote maintenance authentication process in FIG. 13 (step S1406). Then, the MFP 101a checks the authentication result included in the authentication token and the contents of the instruction input by the user (step S1407).

If it is determined in the step S1407 that the user has instructed cancellation of the authentication processing, the MFP 101a terminates the present process.

If it is determined in the step S1407 that the authentication result indicates a failure, the MFP 101a returns to the step S1406.

If it is determined in the step S1407 that the authentication result indicates a success, the MFP 101a determines whether or not a relay server URL associated with the MFP 101a has been received from the management server 107 (step S1408).

If it is determined in the step S1408 that a relay server URL has been received from the management server 107, the MFP 101a executes the step S1402 et seq. On the other hand, if it is determined in the step S1408 that a relay server URL has not been received from the management server 107, the MFP 101a displays an error notification to the effect that acquisition of a relay server URL has failed, on the console section 410 (step S1409), followed by terminating the present process.

Figure 15:
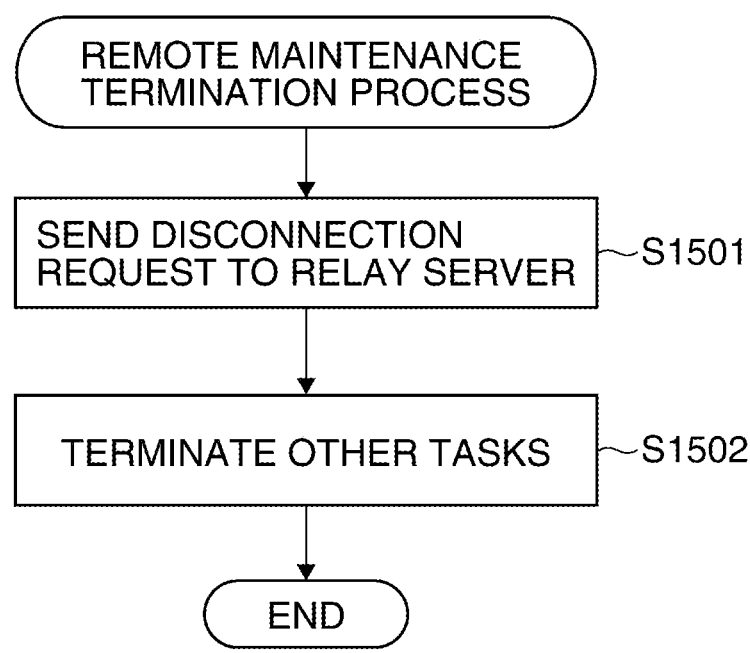
FIG. 15 is a flowchart of a remote maintenance termination process performed in a step in FIG. 11.

FIG. 15 is a flowchart of the remote maintenance termination process performed in the step S1106 in FIG. 11.

Referring to FIG. 15, when termination of the remote maintenance is instructed by a user's operation of the console section 410, the MFP 101a sends a disconnection request to the relay server 106a (step S1501) (see e.g. the step S716 in FIG. 7). Then, the MFP 101a performs processing for terminating other tasks which are associated with the remote maintenance and do not correspond to the disconnection request (step S1502), followed by terminating the present process.

Next, the operations performed by the relay servers 106a and 106b will be described. Note that in the present embodiment, the same operations are performed in the relay servers 106a and 106b, and hence the following description is given of the operation control of the relay server 106a, by way of example.

Figure 16:
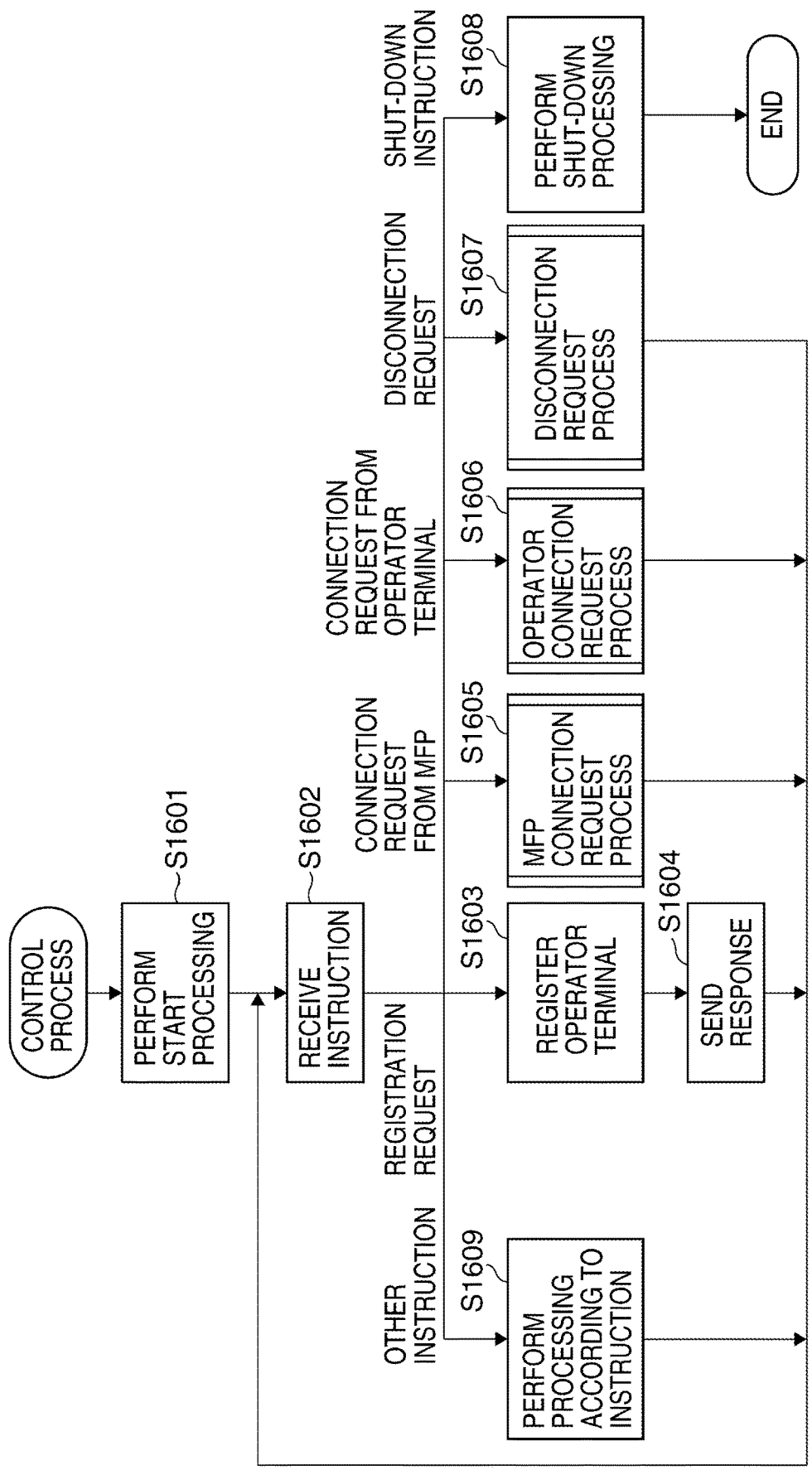
FIG. 16 is a flowchart of a control process performed by the relay server.

FIG. 16 is a flowchart of a control process performed by the relay server 106a appearing in FIG. 1.

The process in FIG. 16 is performed when an instruction for starting the relay server 106a is received.

Referring to FIG. 16, the relay server 106a performs start processing according to the start instruction (step S1601), and receives an instruction (step S1602). The relay server 106a receives an instruction input by operating the console section 507 of the relay server 106a, an instruction from an MFP in the user environment 102a, an instruction from an operator terminal of the call center 105a, and so forth.

If a registration request is received from an operator terminal in the step S1602 (see e.g. the step S703 in FIG. 7), the relay server 106a performs processing for registering the operator terminal (step S1603). Then, the relay server 106a sends a response to the registration request (step S1604) (see e.g. the step S704 in FIG. 7), and returns to the step S1602.

If a connection request is received from an MFP in the step S1602, the relay server 106a performs an MFP connection request process described hereinafter with reference to FIG. 17 (step S1605), and returns to the step S1602.

If a connection request is received from an operator terminal in the step S1602, the relay server 106a performs an operator connection request process described hereinafter with reference to FIG. 18 (step S1606), and returns to the step S1602.

If a disconnection request is received from one of an MFP and an operator terminal in the step S1602, the relay server 106a performs a disconnection request process described hereinafter with reference to FIG. 19 (step S1607), and returns to the step S1602.

If a shut-down instruction for shutting down the relay server 106a is received in the step S1602, the relay server 106a performs processing for shutting down the relay server 106a (step S1608), followed by terminating the present process.

If an instruction other than the above (other instruction) is received in the step S1602, the relay server 106a performs processing according to the received instruction (step S1609), and returns to the step S1602.

Figure 17:
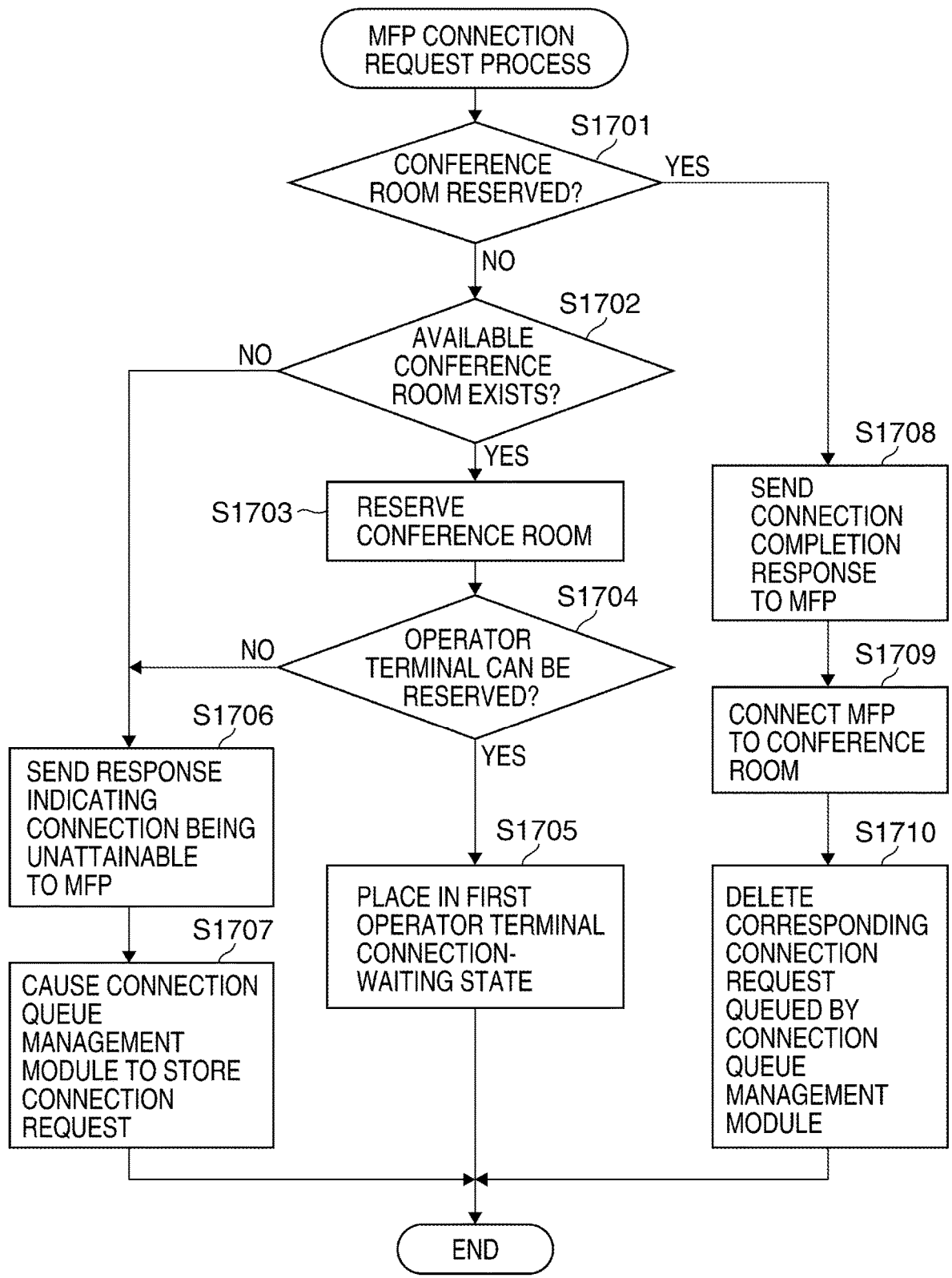
FIG. 17 is a flowchart of an MFP connection request process performed in a step in FIG. 16.

FIG. 17 is a flowchart of the MFP connection request process performed in the step S1605 in FIG. 16.

Referring to FIG. 17, the relay server 106a determines whether or not a conference room has been reserved (step S1701).

If it is determined in the step S1701 that a conference room has not been reserved, the relay server 106a determines whether or not there is an available conference room (step S1702).

If it is determined in the step S1702 that there is an available conference room, the relay server 106a reserves the conference room (step S1703), and determines whether or not it is possible to reserve an operator terminal of the call center 105a (step S1704). In the step S1704, if all operator terminals of the call center 105a have established remote maintenance communication, for example, the relay server 106a determines that it is impossible to reserve an operator terminal of the call center 105a. On the other hand, if there is an operator terminal of the call center 105a, which has not established remote maintenance communication, the relay server 106a determines that it is possible to reserve an operator terminal of the call center 105a.

If it is determined in the step S1704 that it is possible to reserve an operator terminal of the call center 105a, the relay server 106a waits until a connection request is received from an operator terminal (first operator terminal connection-waiting state) (step S1705). After that, the relay server 106a terminates the present process.

If it is determined in the step S1702 that there is no available conference room, or if it is determined in the step S1704 that it is impossible to reserve an operator terminal of the call center 105a, the relay server 106a sends a response indicating that connection cannot be made (connection being unattainable) to the MFP 101a (step S1706) (see e.g. the step S1007 in FIG. 10). Then, the connection queue management module 604 of the relay server 106a stores the connection request received from the MFP 101a (step S1707) (see e.g. the step S1006 in FIG. 10), followed by terminating the present process.

If it is determined in the step S1701 that a conference room has been reserved, this is a case where, in the remote maintenance system 100, the connection queue management module 604 has queued a connection request from an MFP in the user environment 102a, e.g. from the MFP 101b. In this case, the relay server 106a sends a response indicating the connection completion to the MFP 101b (step S1708) (see e.g. the step S1017 in FIG. 10). Then, the relay server 106a causes the MFP 101b to be connected to the reserved conference room (step S1709) (see e.g. the step S1018 in FIG. 10). Then, the relay server 106a deletes the connection request received from the MFP 101b and stored by the connection queue management module 604 (step S1710), followed by terminating the present process.

Figure 18:
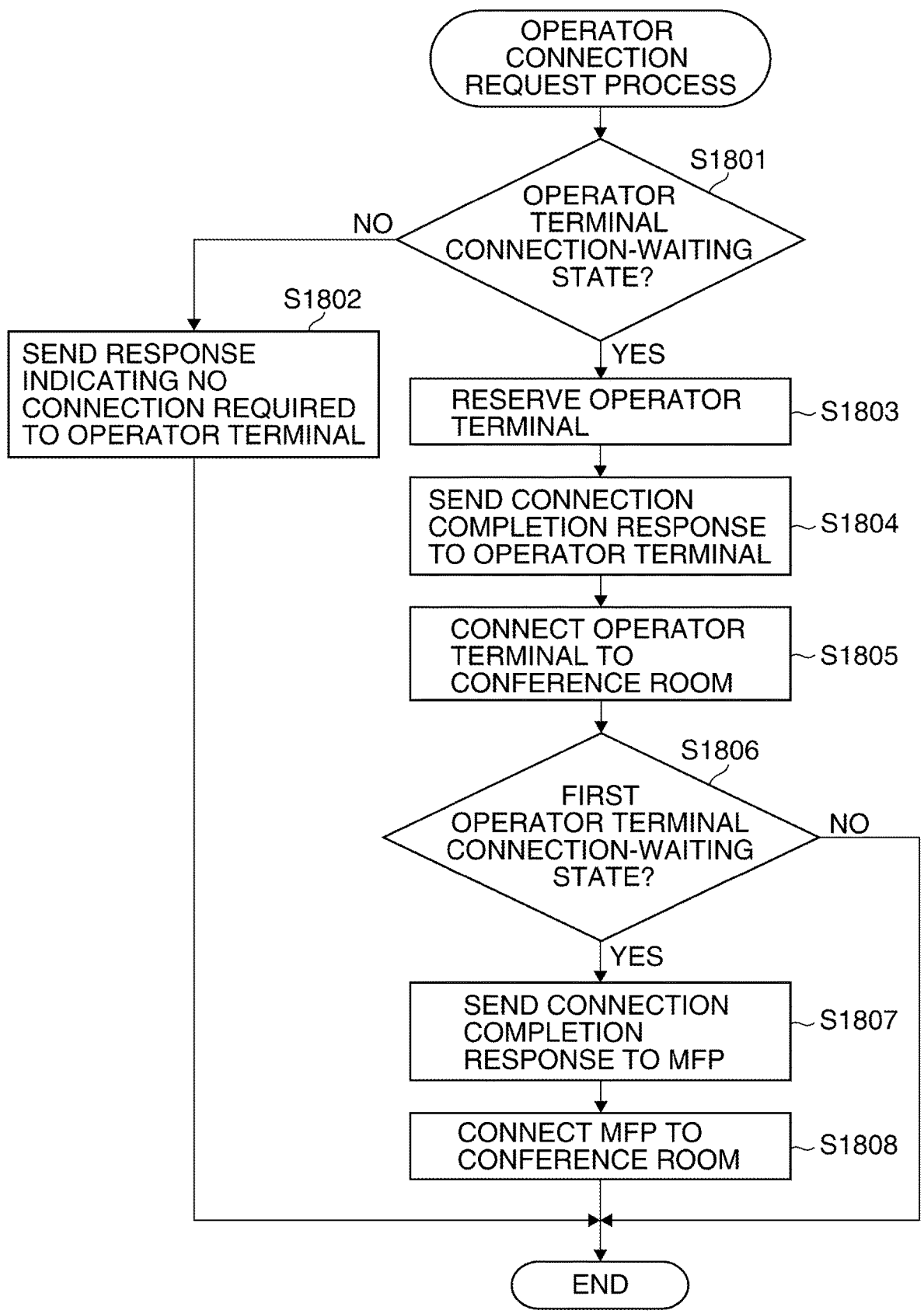
FIG. 18 is a flowchart of an operator connection request process performed in a step in FIG. 16.

FIG. 18 is a flowchart of the operator connection request process performed in the step S1606 in FIG. 16.

Referring to FIG. 18, the relay server 106a determines whether or not the relay server 106a is in the operator terminal connection-waiting state (step S1801). In the step S1801, in a case where the relay server 106a is in the first operator terminal connection-waiting state or the second operator terminal connection-waiting state, the relay server 106a determines that the relay server 106a is in the operator terminal connection-waiting state. On the other hand, if the relay server 106a is neither in the first operator terminal connection-waiting state nor in the second operator terminal connection-waiting state, the relay server 106a determines that the relay server 106a is not in the operator terminal connection-waiting state.

If it is determined in the step S1801 that the relay server 106a is not in the operator terminal connection-waiting state, the relay server 106a sends a response indicating no connection required, to the operator terminal having sent the connection request (step S1802) (see e.g. the step S706 in FIG. 7), followed by terminating the present process.

If it is determined in the step S1801 that the relay server 106a is in the operator terminal connection-waiting state, the relay server 106a reserves the operator terminal having sent the connection request, e.g. the operator terminal 104a (step S1803). Then, the relay server 106a sends a response indicating the connection completion to the operator terminal 104a (step S1804) (see e.g. the step S906 in FIG. 9). Then, the relay server 106a causes the operator terminal 104a to be connected to the reserved conference room (step S1805) (see e.g. the step S907 in FIG. 9). Then, the relay server 106a determines whether or not the relay server 106a is in the first operator terminal connection-waiting state (step S1806).

If it is determined in the step S1806 that the relay server 106a is in the first operator terminal connection-waiting state, the relay server 106a sends a response indicating the connection completion to the MFP having sent the connection request queued in the first operator terminal connection-waiting state (step S1807) (see e.g. the step S909 in FIG. 9). Then, the relay server 106a causes the MFP to be connected to the reserved conference room (step S1808) (see e.g. the step S910 in FIG. 9), followed by terminating the present process.

If it is determined in the step S1806 that the relay server 106a is not in the first operator terminal connection-waiting state, but in the second operator terminal connection-waiting state, the relay server 106a terminates the present process.

Figure 19:
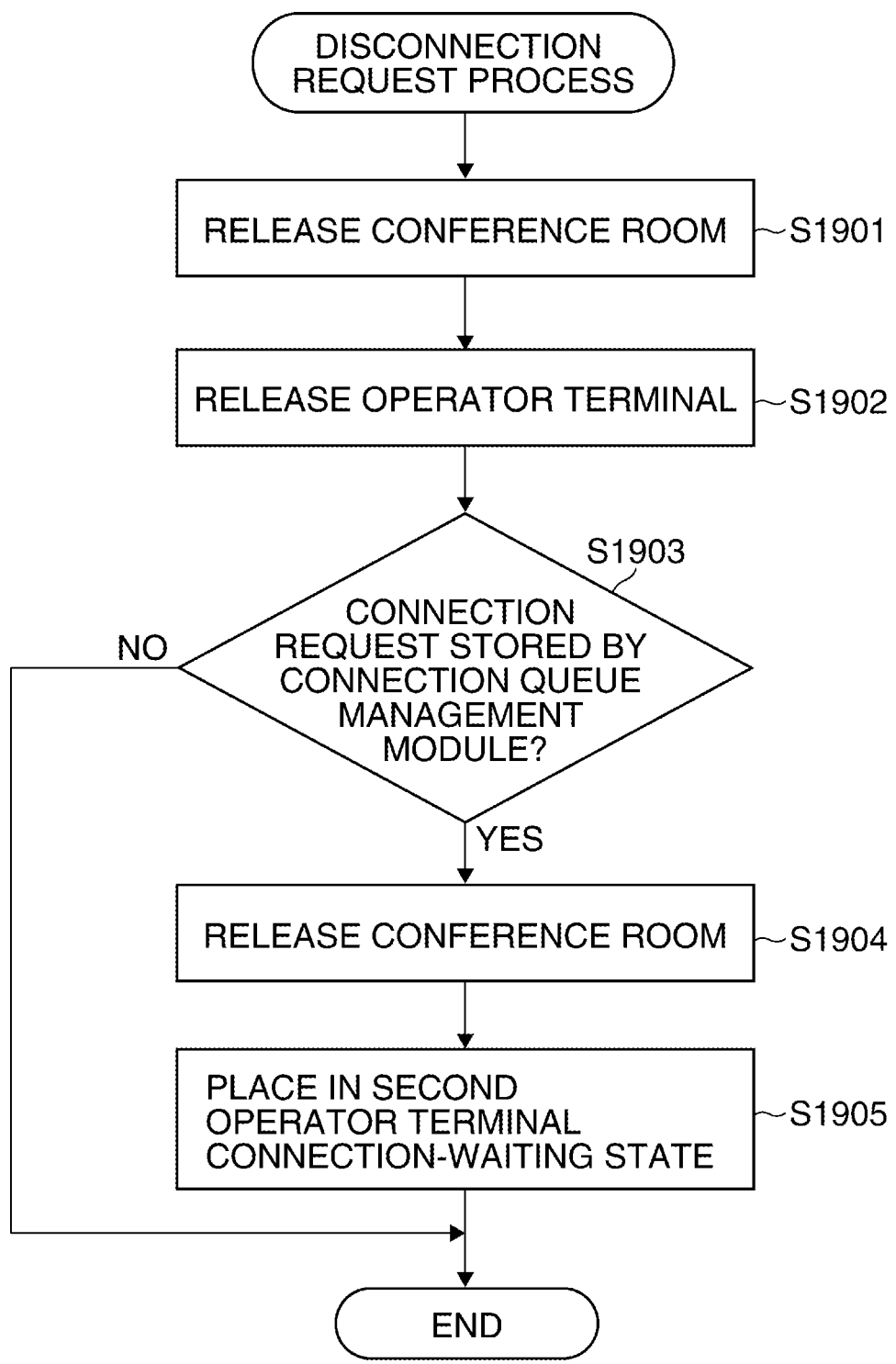
FIG. 19 is a flowchart of a disconnection request process performed in a step in FIG. 16.

FIG. 19 is a flowchart of the disconnection request process performed in the step S1607 in FIG. 16.

Referring to FIG. 19, the relay server 106a releases the reserved conference room (step S1901), and releases the reserved or assigned operator terminal (S1902). Then, the relay server 106a determines whether or not the connection queue management module 604 has queued a connection request received from an MFP (step S1903).

If it is determined in the step S1903 that the connection queue management module 604 has not queued any connection request received from an MFP, the relay server 106a terminates the present process. On the other hand, if it is determined in the step S1903 that the connection queue management module 604 has queued a connection request received from an MFP, the relay server 106a reserves a conference room (step S1904). Then, the relay server 106a waits for a connection request from an operator terminal in a state in which the connection request received from the MFP has been queued by the connection queue management module 604 (second operator terminal connection-waiting state) (step S1905), followed by terminating the present process.

Next, the operations performed by the operator terminals 104a to 104c will be described. Note that in the present embodiment, the same operations are performed in the operator terminals 104a to 104c, and hence the following description is given of the operation control of the operator terminal 104a, by way of example.

Figure 20:
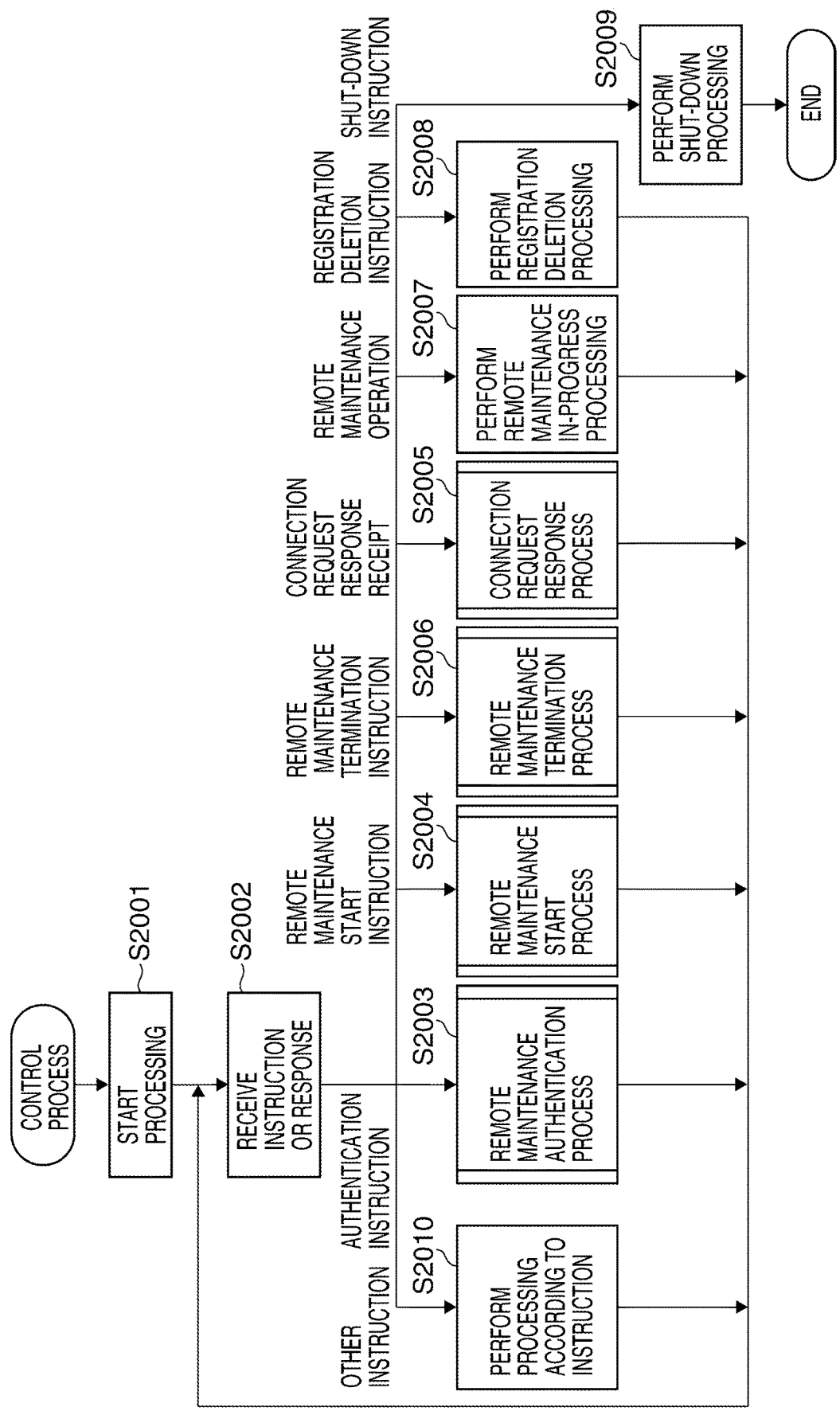
FIG. 20 is a flowchart of a control process performed by an operator terminal appearing in FIG. 1.

FIG. 20 is a flowchart of a control process performed by the operator terminal 104a appearing in FIG. 1.

The process in FIG. 20 is performed when an instruction for starting the operator terminal 104a is provided.

Referring to FIG. 20, the operator terminal 104a performs start processing according to the start instruction (step S2001), and receives an instruction or a response (step S2002). The operator terminal 104a receives an instruction input by operating the console section 507 of the operator terminal 104a, a response from the relay server 106a, and so forth.

If an authentication instruction input by operating the console section 507 is received in the step S2002, the operator terminal 104a performs a remote maintenance authentication process described hereinafter with reference to FIG. 21 (step S2003), and returns to the step S2002.

If a remote maintenance start instruction, such as an operation performed by an operator of the call center 105a for completing preparation for accepting a remote maintenance operation request is received in the step S2002, the operator terminal 104a performs a remote maintenance start process described hereinafter with reference to FIG. 22 (step S2004). Then, the operator terminal 104a returns to the step S2002.

If a response to the connection request is received from the relay server 106a in the step S2002, the operator terminal 104a performs a connection request response process described hereinafter with reference to FIG. 23 (step S2005), and returns to the step S2002.

If a remote maintenance termination instruction input by operating the console section 507 is received in the step S2002, the operator terminal 104a performs a remote maintenance termination process described hereinafter with reference to FIG. 24 (step S2006), and returns to the step S2002.

If a remote maintenance operation input by operating the console section 507 is received in the step S2002, the operator terminal 104a performs remote maintenance in-progress processing (step S2007), and returns to the step S2002.

If an instruction for deleting the operator terminal 104a from registration in the relay server 106a is received in the step S2002, the operator terminal 104a deletes registration of the operator terminal 104a (step S2008), and returns to the step S2002.

If an instruction for shutting down the operator terminal 104a is received in the step S2002, the operator terminal 104a performs processing for shutting down the operator terminal 104a (step S2009), followed by terminating the present process.

If an instruction other than the above (other instruction) is received in the step S2002, the operator terminal 104a performs processing according to the received instruction (step S2010), and returns to the step S2002.

Figure 21:
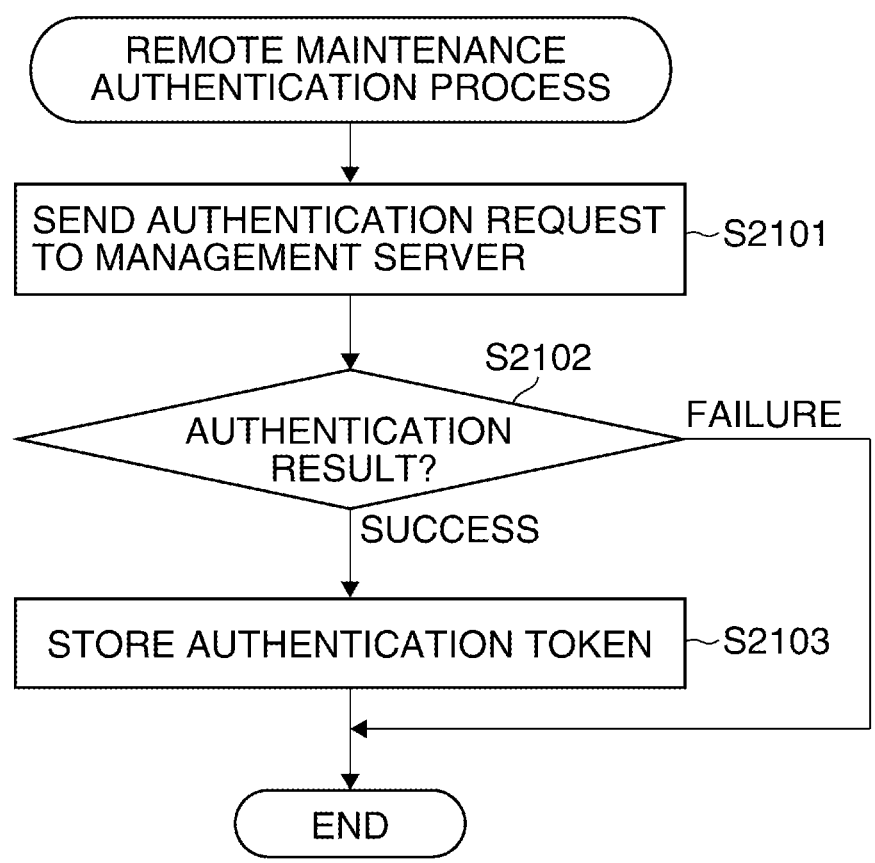
FIG. 21 is a flowchart of a remote maintenance authentication process performed in a step in FIG. 20.

FIG. 21 is a flowchart of the remote maintenance authentication process performed in the step S2003 in FIG. 20.

Referring to FIG. 21, the operator terminal 104a sends an authentication request to the management server 107 (step S2101) (see e.g. the step S701 in FIG. 7), and acquires an authentication token including an authentication result from the management server 107. Then, the operator terminal 104a determines whether the authentication result included in the acquired authentication token indicates a success or a failure (step S2102).

If it is determined in the step S2102 that the authentication result indicates a failure, the operator terminal 104a terminates the present process. On the other hand, if it is determined in the step S2102 that the authentication result indicates a success, the operator terminal 104a stores the acquired authentication token e.g. in the HDD 504 (step S2103), followed by terminating the present process.

Figure 22:
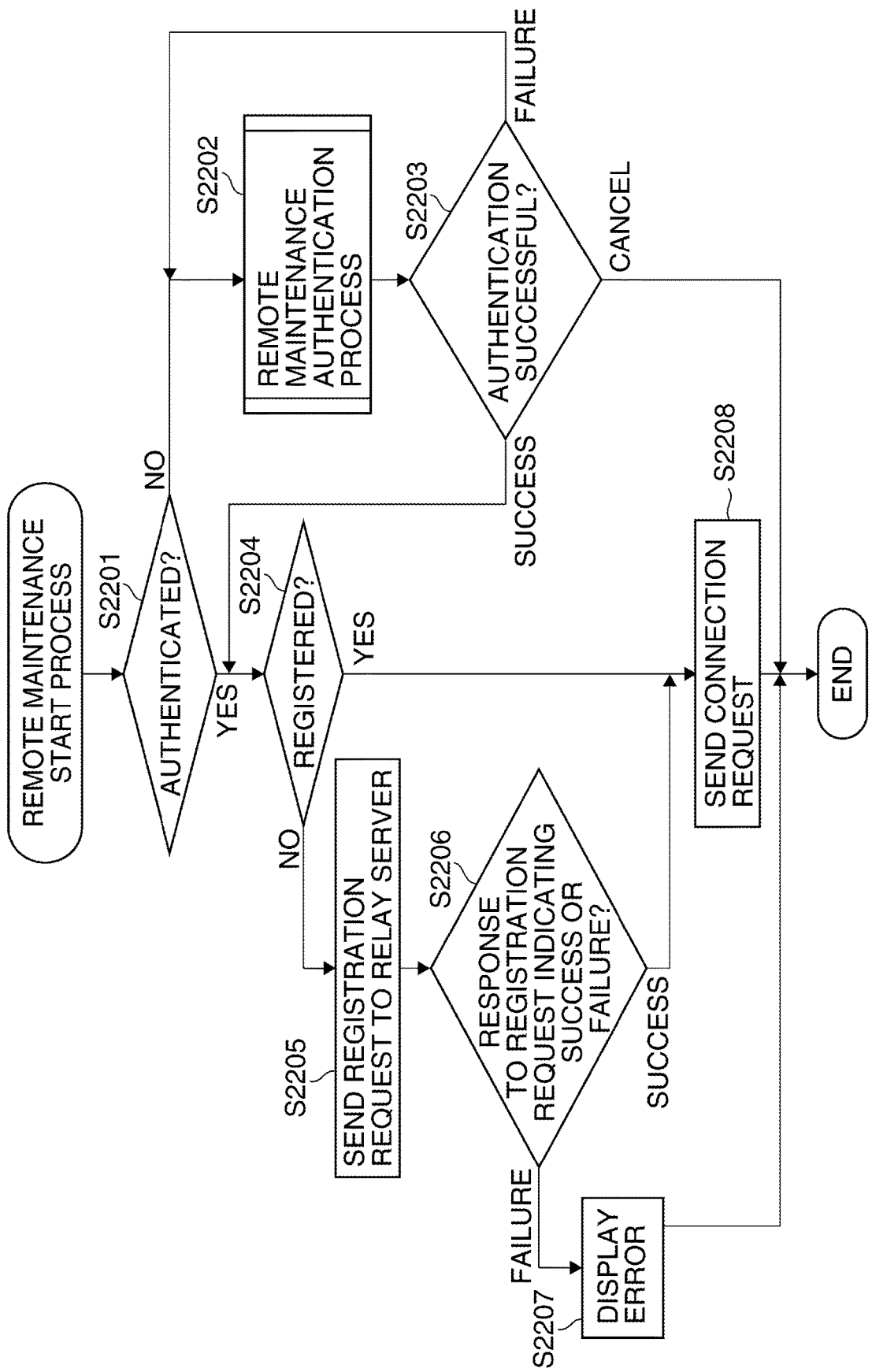
FIG. 22 is a flowchart of a remote maintenance start process performed in a step in FIG. 20.

FIG. 22 is a flowchart of the remote maintenance start process performed in the step S2004 in FIG. 20.

Referring to FIG. 22, the operator terminal 104a determines whether or not the operator terminal 104 has already been subjected to authentication by the management server 107 (step S2201).

If it is determined in the step S2201 that the operator terminal 104 has not been subjected to authentication by the management server 107 yet, the operator terminal 104a performs the remote maintenance authentication process in FIG. 21 (step S2202). Then, the operator terminal 104a checks the authentication result included in the authentication token and the contents of the instruction provided by the user (step S2203).

If it is determined in the step S2203 that the user has instructed cancellation of the authentication processing, the operator terminal 104a terminates the present process.

If it is determined in the step S2203 that the authentication result indicates a failure, the operator terminal 104a returns to the step S2202.

If it is determined in the step S2203 that the authentication result indicates a success, or if it is determined in the step S2201 that the operator terminal 104 has been subjected to authentication by the management server 107, the operator terminal 104a determines whether or not the operator terminal 104a has been registered by the relay server 106a (step S2204).

If it is determined in the step S2204 that the operator terminal 104a has not been registered by the relay server 106a, the operator terminal 104a transmits the authentication token to the relay server 106a. Further, the operator terminal 104a transmits a registration request to the relay server 106a (step S2205) (see e.g. the step S703 in FIG. 7). Then, the operator terminal 104a determines whether a response to the registration request indicates a success or a failure (step S2206).

If it is determined in the step S2206 that the response indicates a failure, the operator terminal 104a displays an error notification to the effect that registration performed by the relay server 106a has failed, on the console section 507 (step S2207), followed by terminating the present process.

If it is determined in the step S2204 that the operator terminal 104a has been registered by the relay server 106a, or if it is determined in the step S2206 that the response indicates a success, the operator terminal 104a sends a connection request to the relay server 106a (step S2208). After that, the operator terminal 104a terminates the present process.

Figure 23:
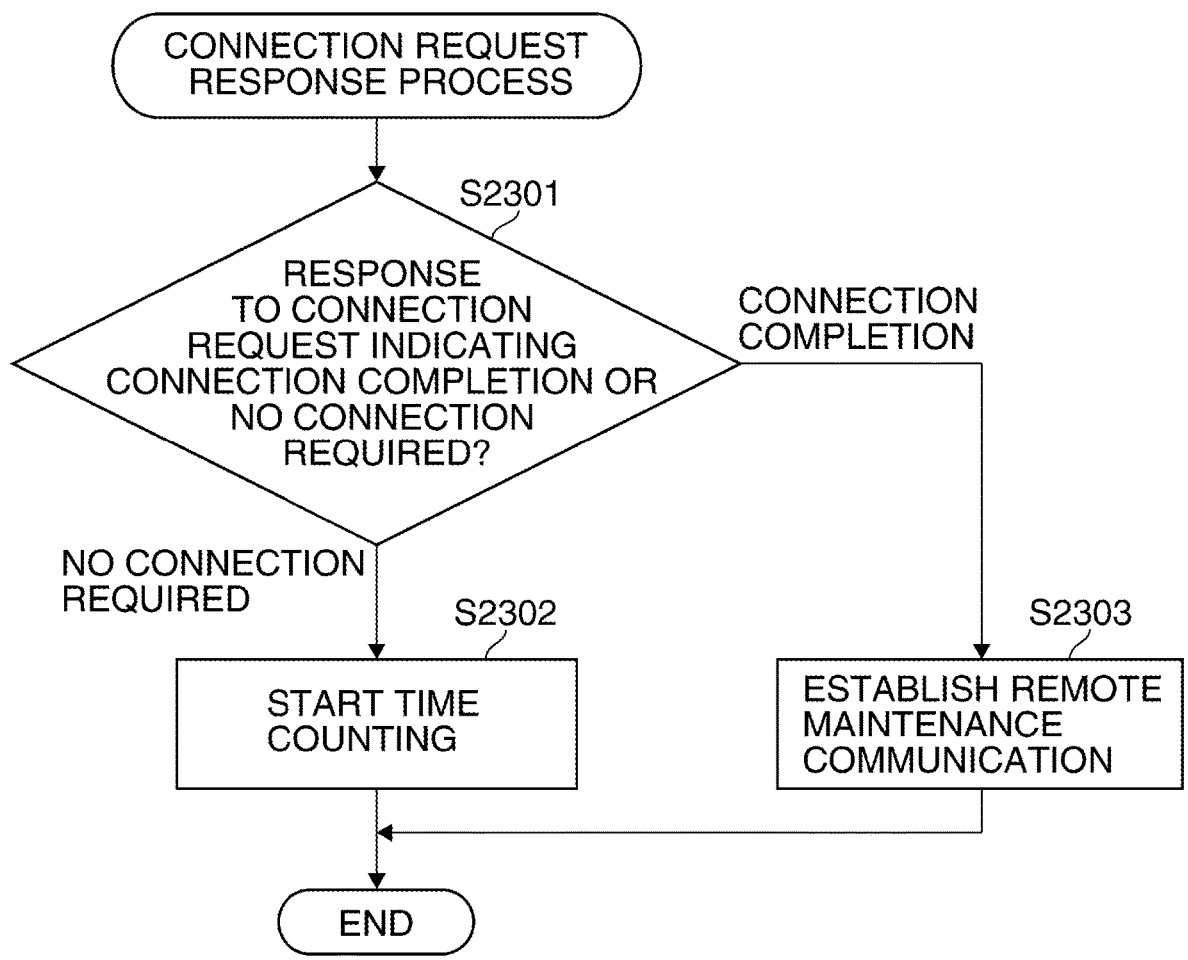
FIG. 23 is a flowchart of a connection request response process performed in a step in FIG. 21.

FIG. 23 is a flowchart of the connection request response process performed in the step S2005 in FIG. 20.

Referring to FIG. 23, the operator terminal 104a determines whether a response to the connection request, received from the relay server 106a, indicates the connection completion or no connection required (step S2301).

If it is determined in the step S2301 that the response indicates no connection required, the operator terminal 104a starts time counting using a connection timer, not shown (step S2302). In the present embodiment, when a predetermined time period elapses after the connection timer, not shown, has started time counting, the operator terminal 104a sends a connection request to the relay server 106a. After that, the operator terminal 104a terminates the present process.

If it is determined in the step S2301 that the response indicates the connection completion, this establishes the remote maintenance communication of the operator terminal 104a (step S2303), followed by terminating the present process.

Figure 24:
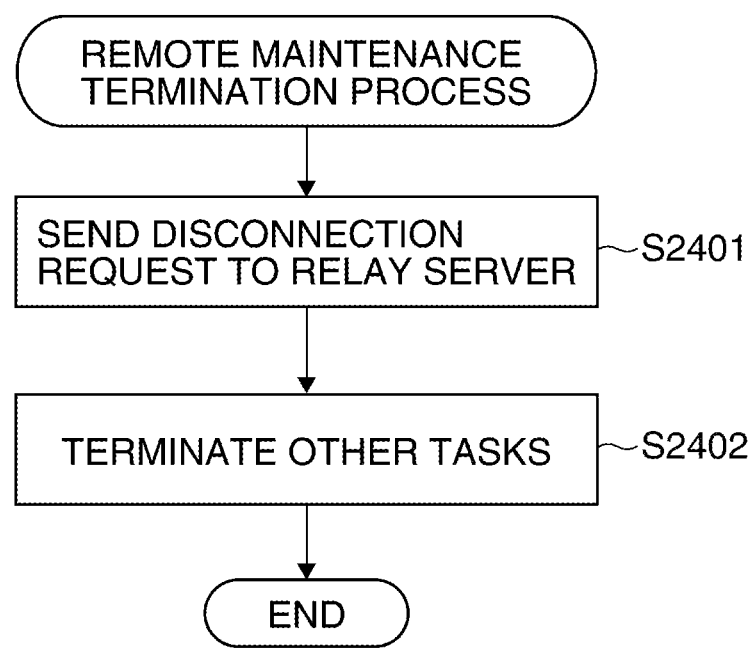
FIG. 24 is a flowchart of a remote maintenance termination process performed in a step in FIG. 21.

FIG. 24 is a flowchart of the remote maintenance termination process performed in the step S2006 in FIG. 20.

Referring to FIG. 24, the operator terminal 104a sends a disconnection request to the relay server 106a (step S2401), and terminates other tasks which are associated with the remote maintenance and do not correspond to the disconnection request (step S2402), followed by terminating the present process.

According to the above-described present embodiment, when a connection request from the MFP 101a is received, the operator terminal 104a which has not established remote maintenance communication is assigned to the MFP 101a having sent the connection request, and the remote maintenance communication between the MFP 101a and the operator terminal 104a is established. That is, it is not necessary to input e.g. a terminal ID for identifying the operator terminal 104a to the console section 410 of the MFP 101a so as to establish the remote maintenance communication between the MFP 101a and the operator terminal 104a. This makes it possible to reduce user's time and effort when establishing the remote maintenance communication between the MFP 101a and the operator terminal 104a.

Further, in the present embodiment, a conference room is formed which can be accessed from both of the MFP 101a and the operator terminal 104a having established the remote maintenance communication, and data is transmitted and received via the conference room in the remote maintenance communication. With this, even when the MFP 101a and the operator terminal 104a are restricted in communication with an external apparatus by respective firewalls, the MFP 101a and the operator terminal 104a can positively transmit and receive maintenance service data to and from each other via the conference room.

Furthermore, in the present embodiment, when all conference rooms are in use, a connection request received from the MFP 101b is queued. When one of the conference rooms is released, the remote maintenance communication between the MFP 101b having sent the connection request in queue and the operator terminal 104a is established. In the remote maintenance communication, maintenance service data is transmitted and received via the released conference room. Further, a connection request received from the MFP 101b when all operator terminals have established remote maintenance communication is queued. When the operator terminal 104a disconnects the remote maintenance communication, the remote maintenance communication between the MFP 101b having sent the connection request in queue and the operator terminal 104a is established. This makes it possible to establish remote maintenance communication for the MFP 101b which received a response indicating that connection could not be made because of no available resources, as soon as a resource is reserved.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-093987 filed May 10, 2017, which is hereby incorporated by reference herein in its entirety.

What is claimed is:

1. A remote maintenance system, for performing a maintenance operation, the remote maintenance system comprising:
   a plurality of operator terminals;
   at least one memory device that stores a set of instructions; and
   at least one processor that executes the set of instructions to:
      receive a first connection request from a first image processing apparatus, for connecting to an operator terminal of the plurality of operator terminals,
      establish a first remote maintenance communication, via a first relay server, between the first image processing apparatus and a first operator terminal of the plurality of operator terminals based on the first connection request,
      assign, in a case where a second connection request is received, a second operator terminal of the plurality of operator terminals that has not established a remote maintenance communication to a second image processing apparatus that has sent the second connection request, and establish the second remote maintenance communication, via a second relay server, between the second image processing apparatus having sent the second connection request and the assigned second operator terminal, queue a connection request received from one of the image processing apparatuses when all of the operator terminals have established the remote maintenance communication, and establish, when any of the plurality of operator terminals has disconnected the remote maintenance communication, the remote maintenance communication between the one of the image processing apparatuses having sent the queued connection request and the operator terminal having disconnected the remote maintenance communication.

2. The remote maintenance system according to claim 1, further comprising a storage area which can be accessed from both an image processing apparatus having sent a connection request and a respective assigned operator terminal, and wherein data is transmitted and received via the storage area in a remote maintenance communication.

3. The remote maintenance system according to claim 2, wherein the remote maintenance system includes a plurality of storage areas, wherein the at least one processor further executes instructions to:

queue a connection request received from an image processing apparatus when all of the storage areas are in use, and establish, in a case where any of the storage areas is released, the remote maintenance communication between an image processing apparatus having sent the queued connection request and a respective assigned operator terminal, and wherein data is transmitted and received via the released storage area in a remote maintenance communication.

4. A communication establishment method of establishing remote maintenance communication for an operator terminal to perform a maintenance operation of an image processing apparatus via a relay server, comprising:

receiving a first connection request from a first image processing apparatus, for connecting to an operator terminal of a plurality of operator terminals; and establishing a first remote maintenance communication, via a first relay server, between the first image processing apparatus and a first operator terminal of the plurality of operator terminals based on the first connection request, assigning, in a case where a second connection request is received, a second operator terminal of the plurality of operator terminals that has not established a remote maintenance communication to a second image processing apparatus that has sent the second connection request, and establishing the second remote maintenance communication, via a second relay server, between the second image processing apparatus having sent the second connection request and the assigned second operator terminal, queuing a connection request received from one of the image processing apparatuses when all of the operator terminals have established the remote maintenance communication, and establishing, when any of the plurality of operator terminals has disconnected the remote maintenance communication, the remote maintenance communication between the one of the image processing apparatuses having sent the queued connection request and the operator terminal having disconnected the remote maintenance communication.

5. A non-transitory computer-readable storage medium storing a computer-executable program for executing a communication establishment method of establishing remote maintenance communication for an operator terminal to perform a maintenance operation of an image processing apparatus via a relay server, wherein the method comprises:

receiving a first connection request from a first image processing apparatus, for connecting to an operator terminal of a plurality of operator terminals; and establishing a first remote maintenance communication, via a first relay server, between the first image processing apparatus and a first operator terminal of the plurality of operator terminals based on the first connection request, assigning, in a case where a second connection request is received, a second operator terminal of the plurality of operator terminals that has not established a remote maintenance communication to a second image processing apparatus that has sent the second connection request, and establishing the second remote maintenance communication, via a second relay server, between the second image processing apparatus having sent the second connection request and the assigned second operator terminal, queuing a connection request received from one of the image processing apparatuses when all of the operator terminals have established the remote maintenance communication, and establishing, when any of the plurality of operator terminals has disconnected the remote maintenance communication, the remote maintenance communication between the one of the image processing apparatuses having sent the queued connection request and the operator terminal having disconnected the remote maintenance communication.

* * * * *